US007371174B2

(12) United States Patent
Baerlocher

(10) Patent No.: US 7,371,174 B2
(45) Date of Patent: May 13, 2008

(54) GAMING DEVICE HAVING A BONUS SCHEME WITH ALTERNATIVE ENDING SEQUENCES

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 564 days.

(21) Appl. No.: 10/160,687

(22) Filed: May 31, 2002

(65) Prior Publication Data

US 2003/0036424 A1 Feb. 20, 2003

Related U.S. Application Data

(63) Continuation-in-part of application No. 09/933,843, filed on Aug. 20, 2001, now Pat. No. 7,172,506.

(51) Int. Cl.
*A63F 13/00* (2006.01)
*A63F 9/24* (2006.01)
*G06F 17/00* (2006.01)
*G06F 19/00* (2006.01)

(52) U.S. Cl. ........................... 463/25; 463/16; 463/29; 273/139

(58) Field of Classification Search .................. 463/25, 463/1, 2, 7, 9-13, 16-21, 30, 31, 36, 38; 273/138.1, 139, 138.2, 236, 237, 242
See application file for complete search history.

(56) References Cited

U.S. PATENT DOCUMENTS 2,743,108 A 4/1956 Sander
3,618,952 A 11/1971 Tallarida
4,624,459 A 11/1986 Kaufman
4,669,731 A 6/1987 Clarke
4,695,053 A 9/1987 Vazquez, Jr. et al.
4,811,953 A 3/1989 Jeng
4,978,129 A 12/1990 Komeda et al.
4,991,848 A 2/1991 Greenwood et al.
5,116,055 A 5/1992 Tracy
5,205,555 A 4/1993 Hamano (Continued)

FOREIGN PATENT DOCUMENTS

AU 97/39339 3/1998

(Continued)

OTHER PUBLICATIONS

Description of Let's Make a Deal Television Show written by www.ballygaming.com, printed Mar. 16, 2001.

(Continued)

*Primary Examiner*—Robert E. Pezzuto
*Assistant Examiner*—Omkar A. Deodhar
(74) *Attorney, Agent, or Firm*—Bell, Boyd & Lloyd LLP

(57) ABSTRACT

A gaming device having a bonus game including a preliminary award generated as an outcome of the bonus game and a plurality of different alternative ending sequences for the bonus game. After said preliminary award is generated, one of said alternative ending sequences is randomly selected to display to the player and the game employs such alternative ending sequence to determine a final award to provide to the player based on the preliminary award and the selected alternative ending sequence.

19 Claims, 14 Drawing Sheets

U.S. PATENT DOCUMENTS

| | | | | |
|---|---|---|---|---|
| 5,342,047 | A | 8/1994 | Heidel et al. | |
| 5,344,144 | A | 9/1994 | Canon | |
| 5,377,973 | A | 1/1995 | Jones et al. | |
| 5,393,057 | A | 2/1995 | Marnell, II | |
| 5,397,125 | A | 3/1995 | Adams | |
| 5,456,465 | A | 10/1995 | Durham | |
| 5,511,781 | A | 4/1996 | Wood et al. | |
| 5,580,309 | A | 12/1996 | Piechowiak et al. | |
| 5,584,764 | A | 12/1996 | Inoue | |
| 5,611,535 | A | 3/1997 | Tiberio | |
| 5,645,485 | A | 7/1997 | Clapper, Jr. | |
| 5,700,009 | A | 12/1997 | Meoni | |
| 5,722,891 | A | 3/1998 | Inoue | |
| 5,769,716 | A | 6/1998 | Saffari et al. | |
| 5,788,573 | A | 8/1998 | Baerlocher et al. | |
| 5,816,918 | A * | 10/1998 | Kelly et al. | 463/16 |
| 5,817,172 | A | 10/1998 | Yamada et al. | |
| 5,823,873 | A | 10/1998 | Moody | |
| 5,823,874 | A | 10/1998 | Adams | |
| 5,823,879 | A * | 10/1998 | Goldberg et al. | 463/42 |
| 5,833,536 | A | 11/1998 | Davids et al. | |
| 5,848,932 | A | 12/1998 | Adams | |
| 5,882,261 | A | 3/1999 | Adams | |
| 5,910,048 | A | 6/1999 | Feinberg | |
| 5,947,820 | A | 9/1999 | Morro et al. | |
| 5,967,893 | A | 10/1999 | Lawrence et al. | |
| 5,980,384 | A * | 11/1999 | Barrie | 463/16 |
| 5,993,316 | A | 11/1999 | Coyle et al. | |
| 5,997,401 | A | 12/1999 | Crawford | |
| 6,004,207 | A | 12/1999 | Wilson, Jr. et al. | |
| 6,012,982 | A | 1/2000 | Piechowiak et al. | |
| 6,012,983 | A | 1/2000 | Walker et al. | |
| 6,015,346 | A | 1/2000 | Bennett | |
| 6,062,980 | A | 5/2000 | Luciano | |
| 6,089,976 | A | 7/2000 | Schneider et al. | |
| 6,102,400 | A | 8/2000 | Scott et al. | |
| 6,102,798 | A | 8/2000 | Bennett | |
| 6,109,610 | A | 8/2000 | Cherry et al. | |
| 6,110,041 | A | 8/2000 | Walker et al. | |
| 6,113,098 | A | 9/2000 | Adams | |
| 6,120,031 | A | 9/2000 | Adams | |
| 6,126,542 | A | 10/2000 | Fier | |
| 6,142,873 | A | 11/2000 | Weiss | |
| 6,146,273 | A | 11/2000 | Olsen | |
| 6,155,925 | A | 12/2000 | Giobbi et al. | |
| 6,158,741 | A | 12/2000 | Koelling | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,522 | B1 | 1/2001 | Walker et al. | |
| 6,168,523 | B1 | 1/2001 | Piechowiak et al. | |
| 6,173,235 | B1 | 1/2001 | Maeda | |
| 6,173,955 | B1 | 1/2001 | Perrie et al. | |
| 6,174,233 | B1 | 1/2001 | Sunaga et al. | |
| 6,174,234 | B1 | 1/2001 | Seibert, Jr. et al. | |
| 6,174,235 | B1 | 1/2001 | Walker et al. | |
| 6,186,894 | B1 | 2/2001 | Mayeroff | |
| 6,190,255 | B1 * | 2/2001 | Thomas et al. | 463/20 |
| 6,203,429 | B1 | 3/2001 | Demar et al. | |
| 6,210,277 | B1 | 4/2001 | Stefan | |
| 6,210,279 | B1 | 4/2001 | Dickinson | |
| 6,217,022 | B1 | 4/2001 | Astaneha | |
| 6,224,482 | B1 | 5/2001 | Bennett | |
| 6,224,483 | B1 | 5/2001 | Mayeroff | |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,238,287 | B1 | 5/2001 | Komori et al. | |
| 6,244,957 | B1 | 6/2001 | Walker et al. | |
| 6,251,013 | B1 | 6/2001 | Bennett | |
| 6,254,482 | B1 | 7/2001 | Walker et al. | |
| 6,261,177 | B1 | 7/2001 | Bennett | |
| 6,270,409 | B1 | 8/2001 | Shuster | |
| 6,283,855 | B1 | 9/2001 | Bingham | |
| 6,299,165 | B1 | 10/2001 | Nagano | |
| 6,302,791 | B1 | 10/2001 | Frohm et al. | |
| 6,309,299 | B1 | 10/2001 | Weiss | |
| 6,309,300 | B1 | 10/2001 | Glavich | |
| 6,312,331 | B1 | 11/2001 | Tamaki | |
| 6,312,334 | B1 | 11/2001 | Yoseloff | |
| 6,315,662 | B1 | 11/2001 | Jorasch et al. | |
| 6,315,663 | B1 | 11/2001 | Sakamoto | |
| 6,322,309 | B1 | 11/2001 | Thomas et al. | |
| 6,328,649 | B1 | 12/2001 | Randall et al. | |
| 6,334,814 | B1 * | 1/2002 | Adams | 463/20 |
| 6,335,815 | B1 | 1/2002 | Kobayashi | |
| 6,336,862 | B1 | 1/2002 | Byrne | |
| 6,346,043 | B1 | 2/2002 | Colin et al. | |
| 6,347,996 | B1 | 2/2002 | Gilmore et al. | |
| 6,358,147 | B1 | 3/2002 | Jaffe et al. | |
| 6,364,767 | B1 | 4/2002 | Brossard et al. | |
| 6,394,902 | B1 | 5/2002 | Glavich et al. | |
| 6,398,201 | B1 | 6/2002 | Solomond et al. | |
| 6,398,218 | B1 | 6/2002 | Vancura | |
| 6,413,161 | B1 * | 7/2002 | Baerlocher et al. | 463/20 |
| 6,428,412 | B1 | 8/2002 | Anderson et al. | |
| 6,439,955 | B1 | 8/2002 | Feketo | |
| 6,439,995 | B1 | 8/2002 | Hughs-Baird et al. | |
| 6,443,837 | B1 | 9/2002 | Jaffe et al. | |
| 6,514,141 | B1 | 2/2003 | Kaminkow | |
| 6,565,436 | B1 | 5/2003 | Baerlocher | |
| 6,569,016 | B1 | 5/2003 | Baerlocher | |
| 6,575,830 | B2 | 6/2003 | Baerlocher et al. | |
| 6,582,306 | B1 | 6/2003 | Kaminkow | |
| 6,589,114 | B2 * | 7/2003 | Rose | 463/20 |
| 6,609,972 | B2 | 8/2003 | Seelig | |
| 6,659,864 | B2 | 12/2003 | McGahn et al. | |
| 6,688,977 | B1 | 2/2004 | Baerlocher et al. | |
| 6,712,694 | B1 | 3/2004 | Nordman | |
| 6,722,981 | B2 | 4/2004 | Kaminkow et al. | |
| 6,722,982 | B2 | 4/2004 | Kaminkow et al. | |
| 6,776,711 | B1 | 8/2004 | Baerlocher | |
| 6,796,901 | B2 | 9/2004 | Baerlocher | |
| 6,811,483 | B1 | 11/2004 | Webb et al. | |
| 6,811,485 | B2 | 11/2004 | Kaminkow | |
| 6,875,108 | B1 | 4/2005 | Hughs-Baird | |
| 6,966,833 | B2 | 11/2005 | Kaminkow et al. | |
| 6,971,955 | B2 | 12/2005 | Baerlocher et al. | |
| 6,979,263 | B2 | 12/2005 | Baerlocher et al. | |
| 7,131,908 | B2 | 11/2006 | Baerlocher | |
| 7,172,506 | B2 | 2/2007 | Baerlocher et al. | |
| 2002/0094861 | A1 | 7/2002 | Seelig et al. | |
| 2003/0027623 | A1 | 2/2003 | Rose | |
| 2003/0036422 | A1 | 2/2003 | Baerlocher et al. | |
| 2003/0162579 | A1 | 8/2003 | Gauselmann | |
| 2004/0053671 | A1 | 3/2004 | Nordman | |
| 2004/0053687 | A1 | 3/2004 | Nordman | |
| 2005/0164774 | A1 | 7/2005 | Gauselmann | |

FOREIGN PATENT DOCUMENTS

| | | | |
|---|---|---|---|
| AU | 99/17318 | | 9/1999 |
| AU | 200069612 | | 10/2000 |
| CA | 2140949 | | 10/1995 |
| EP | 0945837 | A2 | 9/1999 |
| EP | 0984409 | A2 | 3/2000 |
| GB | 2 366 435 | A | 6/2002 |
| JP | 7275432 | | 10/1995 |
| WO | WO 85/00910 | | 2/1995 |
| WO | WO 97/32285 | | 9/1997 |

| | | |
|---|---|---|
| WO | WO 98/09259 | 3/1998 |
| WO | WO 00/12186 | 3/2000 |
| WO | WO 00/17831 | 3/2000 |
| WO | WO 0119476 A1 | 3/2001 |
| WO | WO 0158546 A1 | 8/2001 |
| WO | WO 03/015881 | 2/2003 |
| WO | WO 03/015883 | 2/2003 |
| WO | WO 03/102885 | 12/2003 |

OTHER PUBLICATIONS

Fortune Cookie Brochure written by IGT, published 2000.
Jazzy Jackpots Advertisement written by Atronic, published prior to 2002.
Jumble Article written by Strictly Slots, published Dec. 2000.
Jumble (website) written by WMS, printed Mar. 21, 2001.
Top Dollar Advertisement written by IGT, published in 1998.
Texas Tea Advertisement written by IGT, published in 2000.
Who Dunnit Advertisement written by WMS Gaming, Inc., published Jun. 26, 2001.
Winning Bid Advertisement written by WMS Gaming, Inc., published prior to 2002.
Wheel of Fortune Brochure written by IGT, published in 1998.
A Salute to Game Shows-The Price is Right-Pricing Games. Retrieved from the Internet:<http://ben-schumin.simplenet.com/game-shows/shows/ price-is-right/pricing-games.htm>, Aug. 16, 2000.
By George Advertisement, written by IGT, published 2002.
Groundbreaking Mr. Cashman™ Latest Innovation Advertisement, written by International News.
Jazzy Jackpots Advertisement, written by Atronic.
Jazzy Jackpots Atronic Americas, written by Strictly Slots, p. 44, published Mar. 2001.
Jazzy Jackpost Advertisement written by Atronic, published in 2000.
Jumble Advertisement written by WMS Gaming Inc., published prior to 2000.
Loaded Dice Advertisement written by Konami Gaming, published in 2000.
Marketplace—Aristocrat Mr. Cashman Advertisement, p. 44, published Nov. 2002.
Montecasino Gets Mr. Cashman Article, written by Gaming for Africa, p. 10.
Mr. Cashman Advertisement, written by Reel Power.
Mr. Cashman article, written by Australian News, p. 37.
Rainbow Riches 5-Liner Advertisement, written by BSCI Corporation, published prior to Aug. 20, 2001.
Sphinx Magic Advertisement, written by Atronic Casino Technology, Ltd., published 1997.
Take Your Pick-Anchor Games, written by Strictly Slots, p. 50, published Mar. 2001.
Top Dollar, Technical Brochure, pp. 1-2, written by IGT, published in 1998.
A List of The Price is Right Pricing Games, http://en.wikipedia.org (website), printed on Aug. 8, 2007, available prior to 2002.
A Salute to Game Shows-The Price is Right-Pricing Games (website). Retrieved from the Internet on Aug. 8, 2007: http://ben-schumin.simplenet.com/game-shows/shows/price-is-right/pricing-games.htm, available prior to 2002.
A Salute to Game Shows-The Price is Right-Pricing Games (website). Retrieved from the Internet on Aug. 8, 2007: http://ben-schumin.simplenet.com/game-shows/shows/price-is-right/pricing-games-2.htm, available prior to 2002.
A Salute to Game Shows-The Price is Right-Pricing Games (website). Retrieved from the Internet on Aug. 8, 2007: http://ben-schumin.simplenet.com/game-shows/shows/price-is-right/pricing-games-3.htm, available prior to 2002.
A Salute to Game Shows-The Price is Right-Pricing Games (website). Retrieved from the Internet on Aug. 8, 2007: http://ben-schumin.simplenet.com/game-shows/shows/price-is-right/pricing-games-4.htm, available prior to 2002.
Any Number Game Description, (website), printed on Aug. 8, 2007, available prior to 2002.
Babooshka Advertisement in Gaming for Africa, written by Atronic, published in May 2002.
Black Swan Wagering Description and Pay-table, written by IGT, published prior to 2002.
Fey, Marshall, Slot machines - A Pictorial History of the First 100 Years, Liberty Bell Books, 5th Ed, 1997.
Free Fall Poker Description written by IGT, available prior to 2002.
Jackpot Party Brochure and Articles, written by WMS Gaming, Inc, published in 1988.
Neon Nights Advertisement, written by IGT, published in 2000.
Office Action dated Oct. 2, 2002 for U.S. Appl. No. 09/933,843.
Office Action dated Oct. 17, 2002 for U.S. Appl. No. 09/934,003.
Office Action dated Feb. 4, 2003 for U.S. Appl. No. 09/933,843.
Office Action dated Jun. 26, 2003 for U.S. Appl. No. 09/934,003.
Office Action dated Jul. 30, 2003 for U.S. Appl. No. 09/933,843.
Office Action dated Jan. 2, 2004 for U.S. Appl. No. 09/934,003.
Office Action dated Mar. 22, 2004 for U.S. Appl. No. 09/933,843.
Office Action dated Oct. 4, 2004 for U.S. Appl. No. 09/934,003.
Office Action dated Nov. 9, 2005 for U.S. Appl. No. 09/934,003.
Office Action dated Feb. 15, 2006 for U.S. Appl. No. 09/933,843.
Office Action dated Jun. 9, 2006 for U.S. Appl. No. 09/933,843.
Office Action dated Nov. 29, 2006 for U.S. Appl. No. 09/934,003.
Office Action dated Feb. 21, 2007 for U.S. Appl. No. 09/934,003.
Office Action dated Apr. 3, 2007 for U.S. Appl. No. 10/660,281.
Price is Right "Bump" Description, written by gscentral.net (web site), available prior to 2002.
Price is Right "Coming or Going" Description, written by gscentral.net (web site), available Oct. 2003.
Price is Right "Flip Flop" Description, written by gscentral.net (web site), available Feb. 25, 2005.
Price is Right "Freeze Frame" Description, written by gscentral.net (web site), available prior to 2002.
Price is Right "Push Over" Description, written by gscentral.net (web site), available prior to 2002.
Price is Right "Side by Side" Description, written by gscentral.net (web site), available prior to 2002.
Price is Right "Squeeze Play" Description, written by gscentral.net (web site), available prior to 2002.
Slot Machine Game With Roaming Wild Card Game Description, available prior to 2002.
Take Your Pick Game Brochure, written by IGT, published 1999.
Tetris Game Description, written by Radica, published in 2000.
The Price is Right Game Description, http://en.wikipedia.org (website), printed on Aug. 8, 2007, available prior to 2002.
Three Strikes Game Description, http://en.wikipedia.org (website), printed on Aug. 7, 2007, available prior to 2002.
Tokenization Game Description, written by IGT, available prior to 2002.
Vision Bonus Games Advertisement includes "Diamond Fives Buy-A-Bonus Spin," written by IGT, published 1999.
Wild Streak Game Advertisement, written by WMS Gaming, Inc., published Mar. 2001.

* cited by examiner

GAMING DEVICE HAVING A BONUS SCHEME WITH ALTERNATIVE ENDING SEQUENCES

PRIORITY CLAIM

This application is a continuation-in-part of and claims the benefit of U.S. patent application Ser. No. 09/933,843 filed Aug. 20, 2001 now U.S. Pat. No. 7,172,506, the contents of which are incorporated in its entirety herein.

CROSS REFERENCE TO RELATED APPLICATIONS

The present invention relates to the following pending commonly owned U.S. patent applications: "Gaming Device Having Player Selectable Award Digits And Award Modification Options," Ser. No. 09/934,003,; "Game Device Having Player-Selectable Award Digits and Award Modification Options," Ser. No. 10/660,281, "Game Device Having A Game Game Device Having A Game With Incremental Value Disclosure And Value Modification," Ser. No. 10/661,209, "Gaming Device Having A Game With A Moving Digit Generated Outcome," Ser. No. 11/222,914, "Gaming Device Having A Weighted Probability For Selecting A Bonus Game," Ser. No. 11/534,049, and "Gaming Device Having Award Modification Options For Player Selectable Award Digits," Ser. No. 11/626,632.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme with alternative ending sequences.

BACKGROUND OF THE INVENTION

Known gaming devices include games that provide awards to a player after a player plays the game. The games typically display the award after its generation. The games then provide the award to the player and end or move on to other game activity. An award or monetary win provides excitement and enjoyment to the player. Awards and monetary wins also attract passersby or persons observing a game in progress. It is widely believed that gaming establishments endeavor to maximize the attraction from gaming device wins by placing higher win frequency games in visible areas.

Players become accustomed to bonus schemes in gaming machines after playing them a number of times. While players feel comfortable playing games with which they are familiar, players can tire of repetitious bonus schemes, especially those involving relatively little player interaction. A need therefore exists to enhance the award issuance portion of a bonus game of a gaming device. A need also exists to add variety to at least a portion of a game, such that the player becomes familiar with the game and the game provides variety, excitement and enjoyment to the player.

SUMMARY OF THE INVENTION

The present invention provides a gaming device having a bonus scheme with alternative ending sequences and, in particular, a gaming device which includes: (i) a processor; (ii) a bonus game controlled by the processor; and (iii) an award generated by or during the bonus game which includes one of a plurality of alternative ending sequences.

One of the alternative ending sequences is to provide the generated award to a player, which is the normal or known outcome of the bonus game. In this case, the game includes a game credit indicator or display that updates by at least one additional game credit via the generated award. This is generally referred to as a credit ending sequence.

Another alternative ending sequence includes increasing the generated award. The game preferably increases the award by displaying a bonus game. The game includes redisplaying the original game or displaying a different game. This is generally referred to as an award increase ending sequence or increasing ending sequence.

A further alternative ending sequence includes providing the player an option to exchange the generated award in the bonus game for another generated award. The gaming device provides an input device with which a player who is content with the generated award can keep the generated award. The gaming device also provides an input device with which a player who desires to risk obtaining a smaller award in exchange for a chance at a larger award can execute the exchange. As with the award increase ending sequence in this exchange ending sequence, the gaming device preferably exchanges the award by displaying a game. Again, the gaming device includes redisplaying the original game or displaying a different game. As alluded to, the game includes replacing the generated award with a larger, smaller or equal award.

The method for operating a gaming device having a bonus game with alternative ending sequences generally includes: (a) displaying a bonus game; (b) generating an award as an outcome of the bonus game; (c) generating one of a plurality of alternative ending sequences such as an award crediting sequence, an award increase sequence or an award exchange sequence; and (d) executing the generated alternative ending sequence.

In the method, executing the award crediting ending sequence includes displaying at least one additional game credit in a game credit indicator or meter. Executing the award increase ending sequence includes redisplaying the original game or displaying a different game. Executing the exchange ending sequence includes: (i) enabling the player to accept or reject the option; (ii) redisplaying the original game or displaying a different game; and (iii) replacing the generated award with another generated award if the player accepts the option.

It should be appreciated that the present invention contemplates other suitable alternative ending sequences. Generally, the present invention is employed in bonus rounds where the player is in most instances guaranteed to win an award. However, it should be appreciated that the present invention could be employed in a base or primary game, wherein a player may or may not win an award. In this case, the alternative ending sequences occur when a player wins a base game award.

It is therefore an advantage of the present invention to provide an improved gaming device and method of operating the same.

It is another advantage of the present invention to provide a gaming device having a bonus round with alternative ending sequences.

It is a further advantage of the present invention to provide a gaming device having a primary game with alternative ending sequences.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
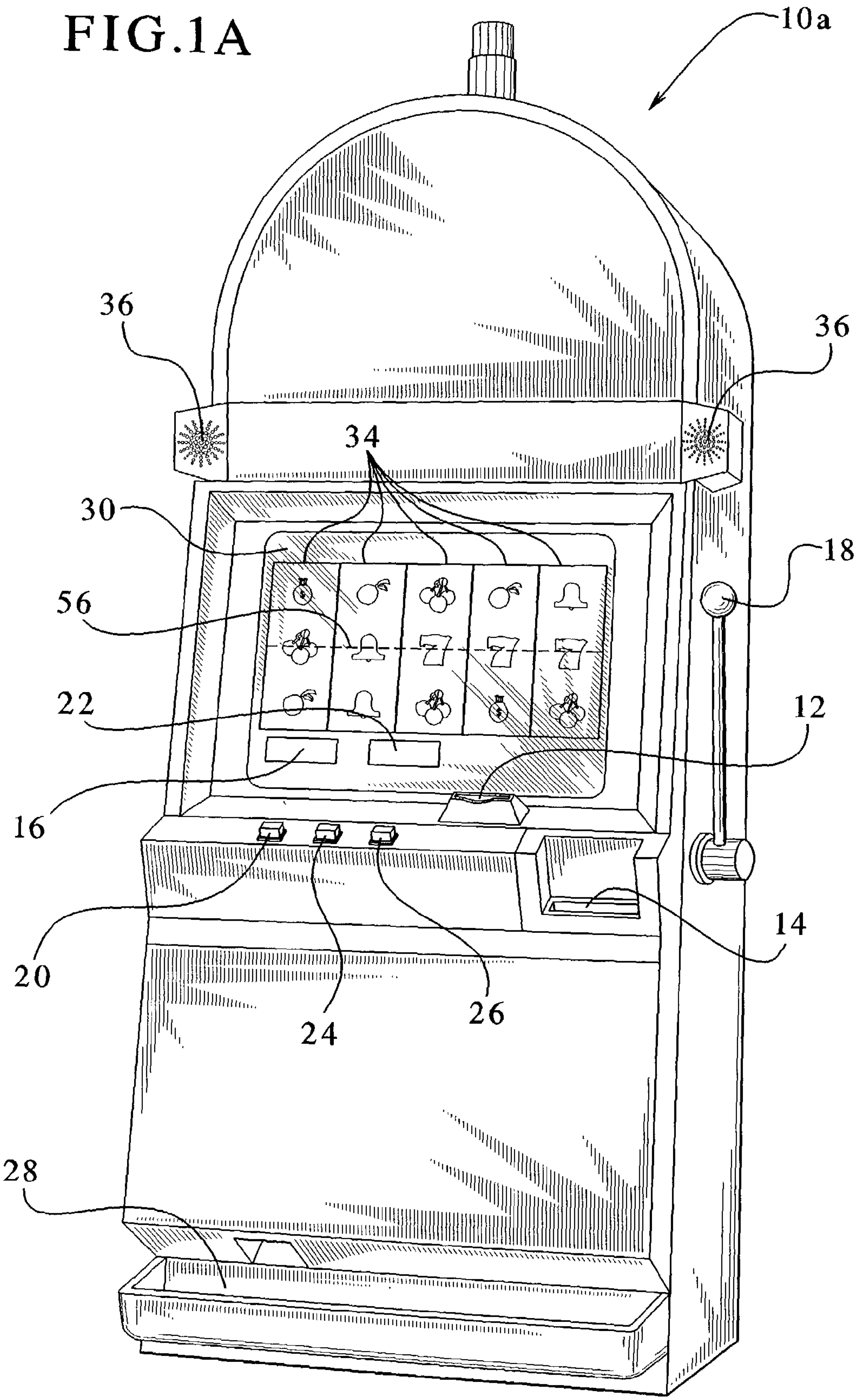
FIGS. 1A and 1B are perspective views of alternative embodiments of the gaming device of the present invention.
Figure 1B:
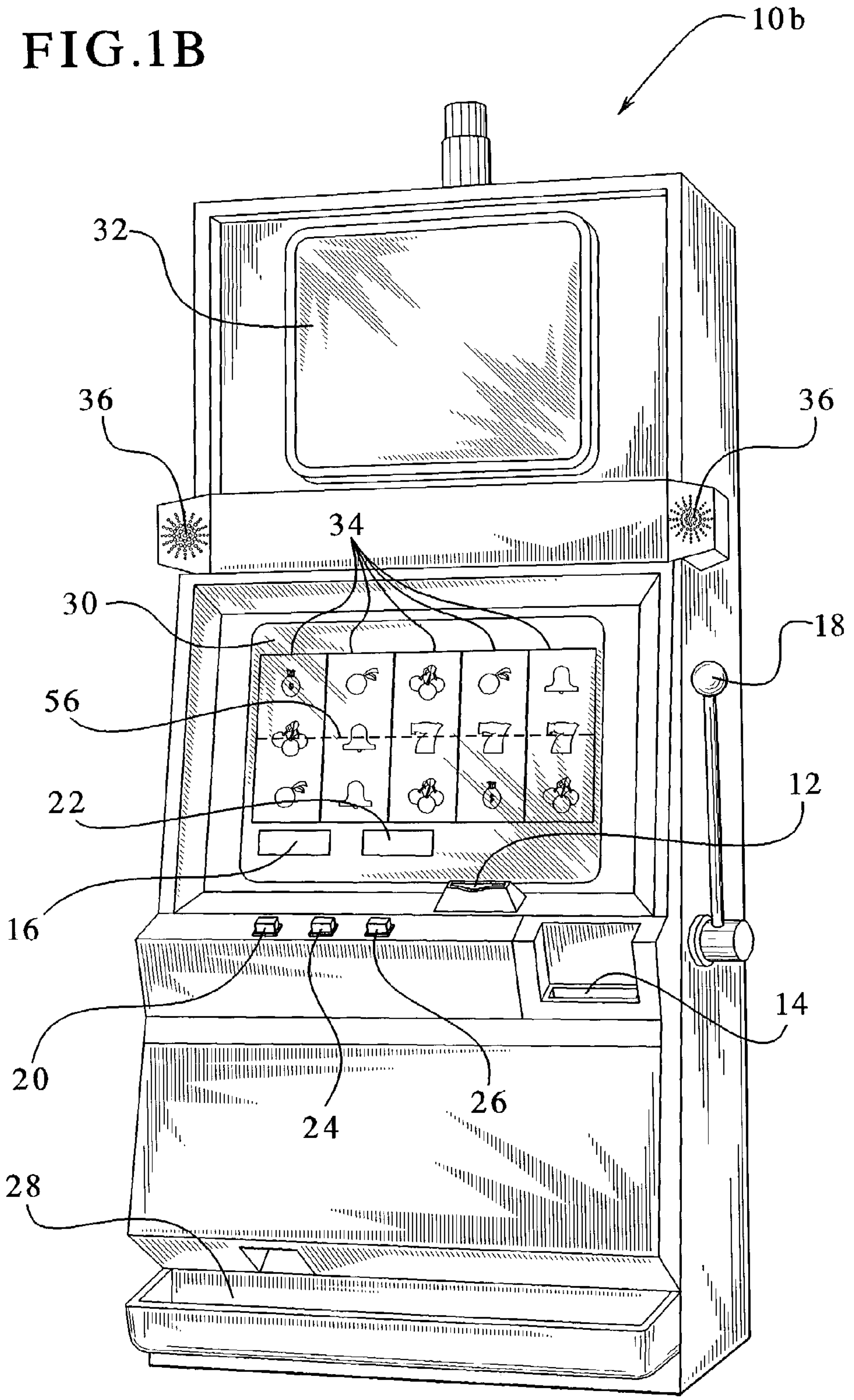

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is employed in a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
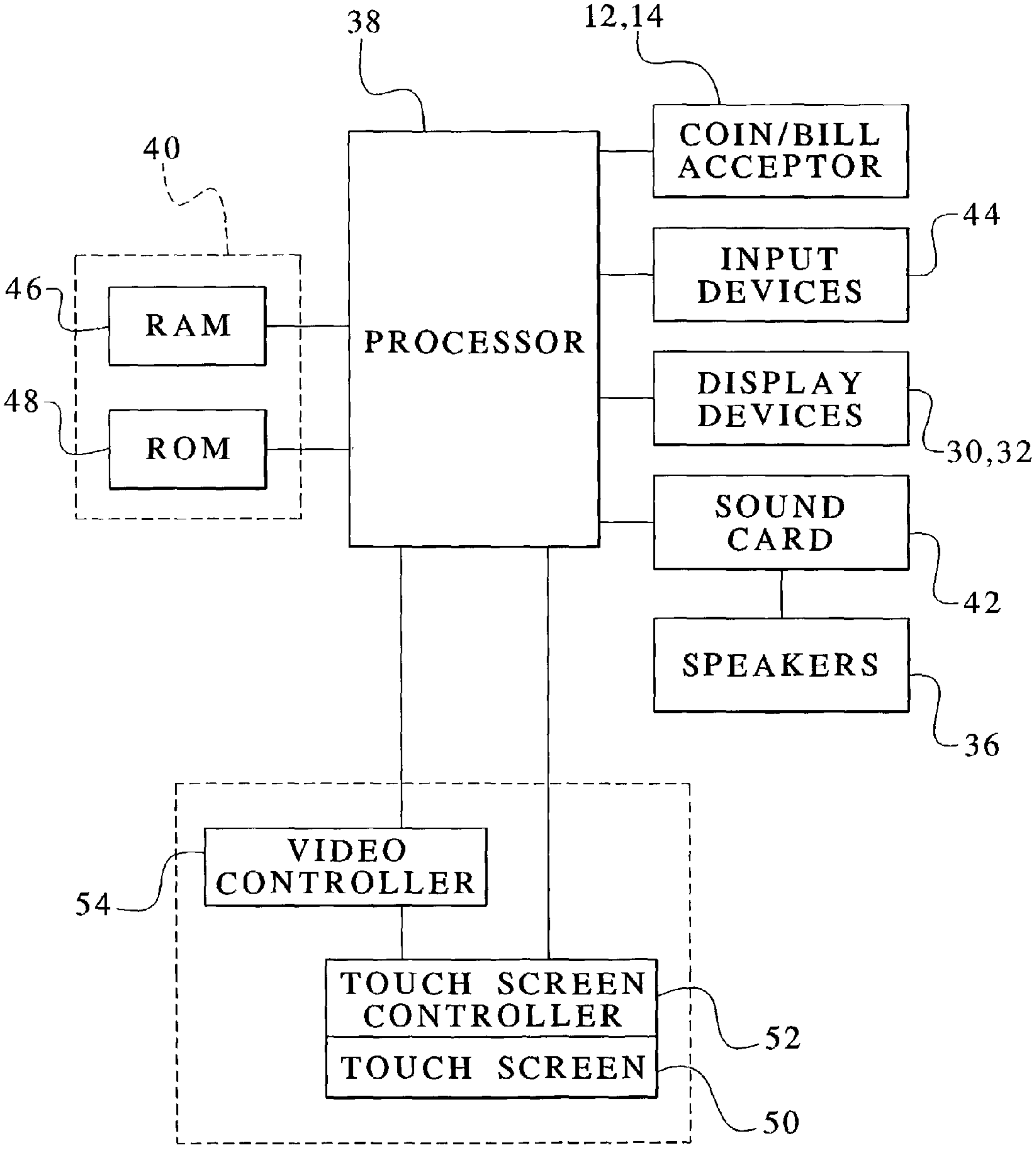
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on a number of reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on a number of reels 34, but not necessarily along a payline 56, appearing on any different set of reels 34 a number of times or appearing anywhere on the display device the necessary number of times.

Alternative Endings

Figure 3:
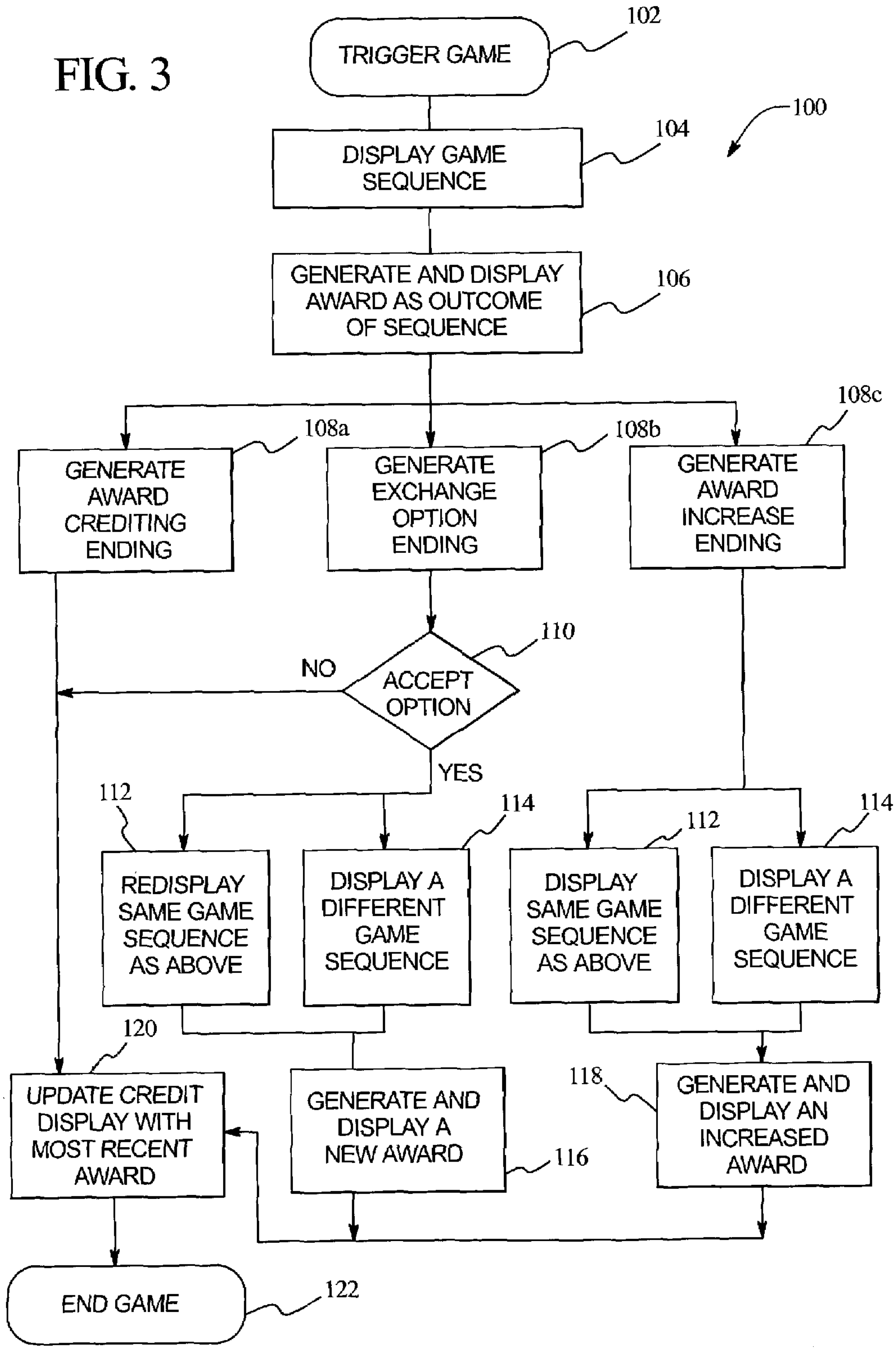
FIG. 3 is a schematic flow diagram of one preferred method of operation for a gaming device having a bonus game with the alternative ending sequences of the present invention.

Referring now to FIG. 3, one method 100 for operating a gaming device having a bonus game with alternative ending sequences is illustrated. Upon a game triggering event, as indicated by the oval 102, the gaming device displays a game as indicated by the block 104. In a stand alone game embodiment, a game triggering event may be the player's deposit of an appropriate amount of money and initial input or wager. For example, in a slot embodiment, pulling arm 18 or pushing play button 20 (see FIGS. 1 and 2) triggers or initiates the game. In a bonus round embodiment, the game triggering event is the player's achievement of a qualifying condition such as receiving a predetermined symbol or combination of symbols along a payline 56 (see FIGS. 1 and 2).

The present invention is described primarily herein with respect to a bonus game where the player obtains awards such as credits, although it should be appreciated that the present invention can be employed in a primary or base game where the player may or may not win an award. In such primary games the present invention would preferably be employed when the player wins a primary game award.

The gaming device preferably displays the game as indicated by the block 104, on one of the display devices 30 or 32 of FIGS. 1A and 1B. The game may or may not include player interaction because certain bonus games include player interaction and certain bonus games merely randomly generate an award for the player. An example bonus game is illustrated in FIGS. 5A through 5I and discussed below.

The game generates an award for the player, as indicated by the block 106. The awards include but are not limited to game credits, a game credit modifier such as a multiplier that multiplies a number of gaming device credits such as a bet, a total win, a payline 56 (FIGS. 1A and 1B) win, etc. The awards also include representing other items of value such as a number of picks from a prize pool. Once the bonus game generates an award for the player, the game preferably displays the award to the player on the appropriate display device, as further indicated by the block 106.

Figure 4A:
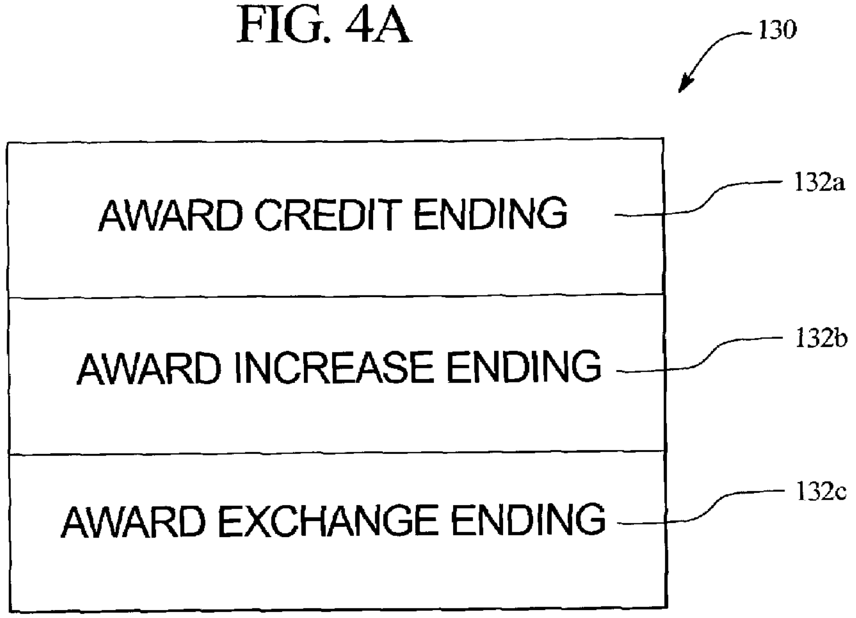
FIGS. 4A and 4B are tables having non-weighted and weighted alternative ending sequence entries, whereby the game randomly selects one of the entries.
Figure 4B:
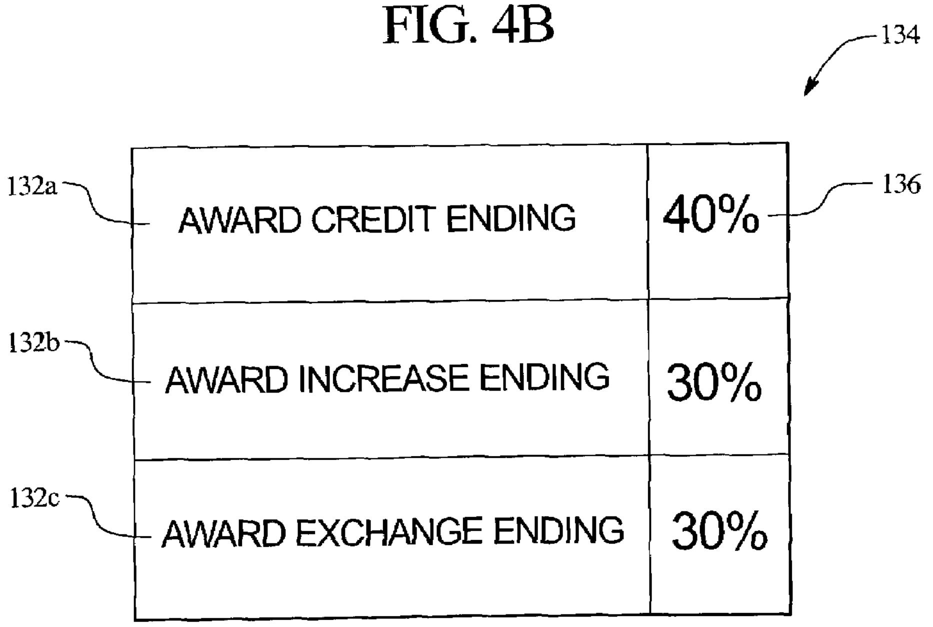

Instead of providing the generated award to the player such as automatically crediting the player's credit display 16 or other suitable indicator, the game of the present invention generates one of a plurality of alternative ending sequences, as indicated by the blocks 108*a* through 108*c*. Schematic alternative ending tables, which the game employs to generate an alternative ending, are illustrated in FIGS. 4A and 4B and discussed below.

One alternative ending sequence as indicated by the block 108*a*, includes the standard ending of crediting the player with the generated award. Executing this award crediting alternative ending sequence includes displaying or updating at least one additional game credit in a game's credit indicator or credit display 16. More specifically, the game updates the player's credit display 16 by the amount of the generated award as indicated by the block 120. After crediting the player with an award, the bonus game ends as indicated by the oval 122, and the game then returns to the base game or continues with a different part of the bonus round. In a stand alone embodiment or in a primary game embodiment of the present invention, the game enables the player to place another wager.

Another alternative ending sequence as indicated by the block 108*b*, includes providing the player with an award exchange option. This award exchange ending sequence enables the player to risk the currently generated award to try for an award upgrade, increase or enhancement. The award exchange option includes replacing the currently generated award with an award of a higher, equal or lower value (e.g., more, equal or less credits) or a different type of award such as a prize. The element of risk forces the player to evaluate the value of the current award versus the award that the player may get as a replacement. The player must accept such award if the game generates such a replacement.

Executing the award exchange ending sequence therefore preferably includes first enabling the player to accept the option or to keep the generated award as indicated by the diamond 110. The game alternatively includes automatically executing the award exchange alternative ending sequence (in which case it is not an option). To increase excitement and enjoyment, the game preferably lets the player decide whether to accept the currently generated award or risk it for the chance at an upgrade, increase or enhancement.

If the player keeps the currently generated award by not accepting the option, as indicated by the diamond 110, the game updates the player's credit display 16 by the amount of the generated award, as indicated by the block 120, and preferably ends the game, as indicated by the oval 122. If the player risks the currently generated award by accepting the option, as indicated by the diamond 110, the game either redisplays the same game provided in connection with the block 104, as indicated by the block 112, or displays a different game than the one provided in connection with the block 104, as indicated by the block 114.

Figure 7A:
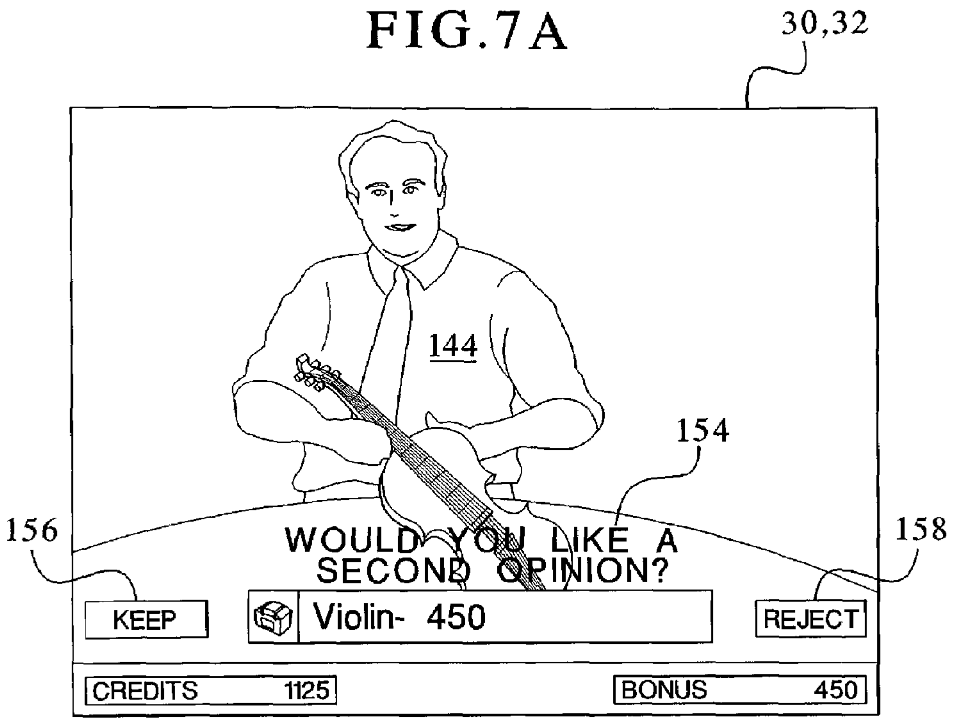
FIGS. 7A, 7B and 7C are front elevational views of one of the display devices of FIGS. 1A and 1B illustrating an award exchange ending sequence, wherein the game redisplays the bonus game.
Figure 7B:
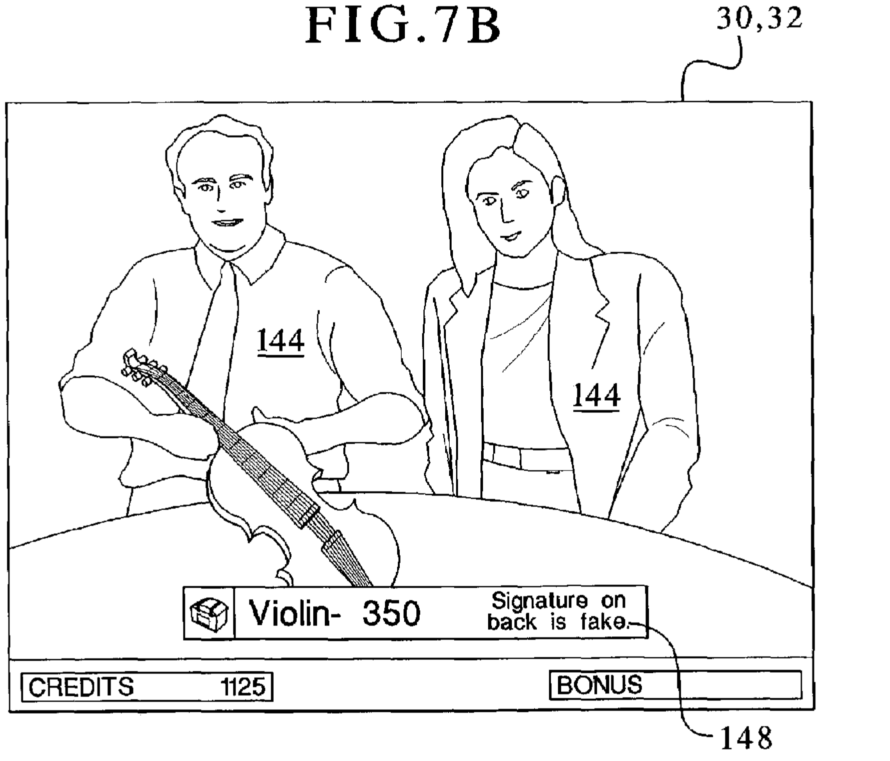
Figure 7C:
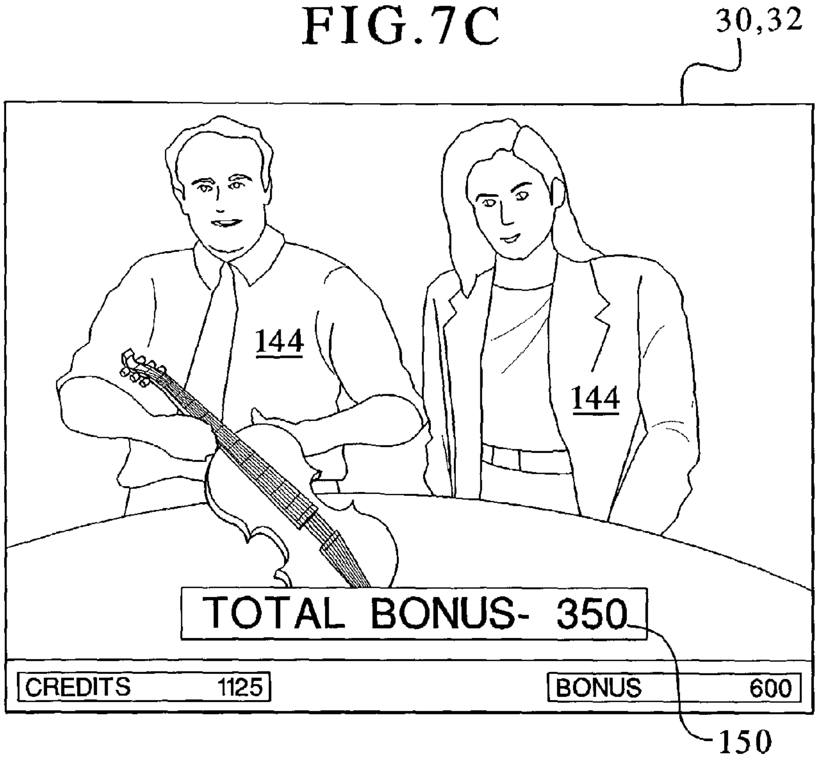
Figure 8A:
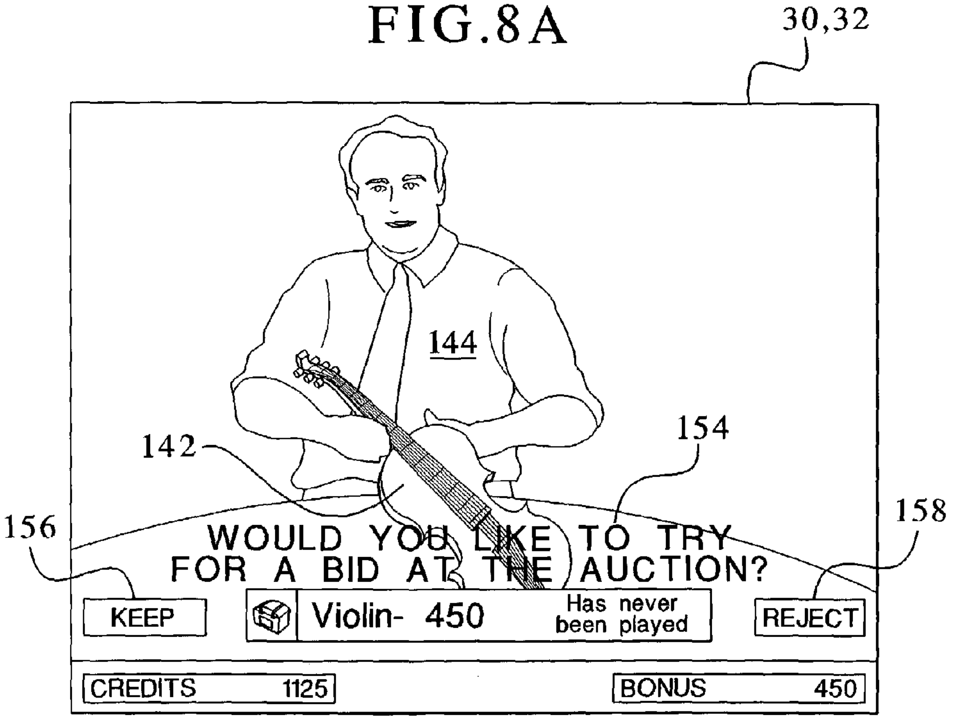
FIGS. 8A, 8B and 8C are front elevational views of one of the display devices of FIGS. 1A and 1B illustrating an award exchange ending sequence, wherein the game displays a new bonus game.
Figure 8B:
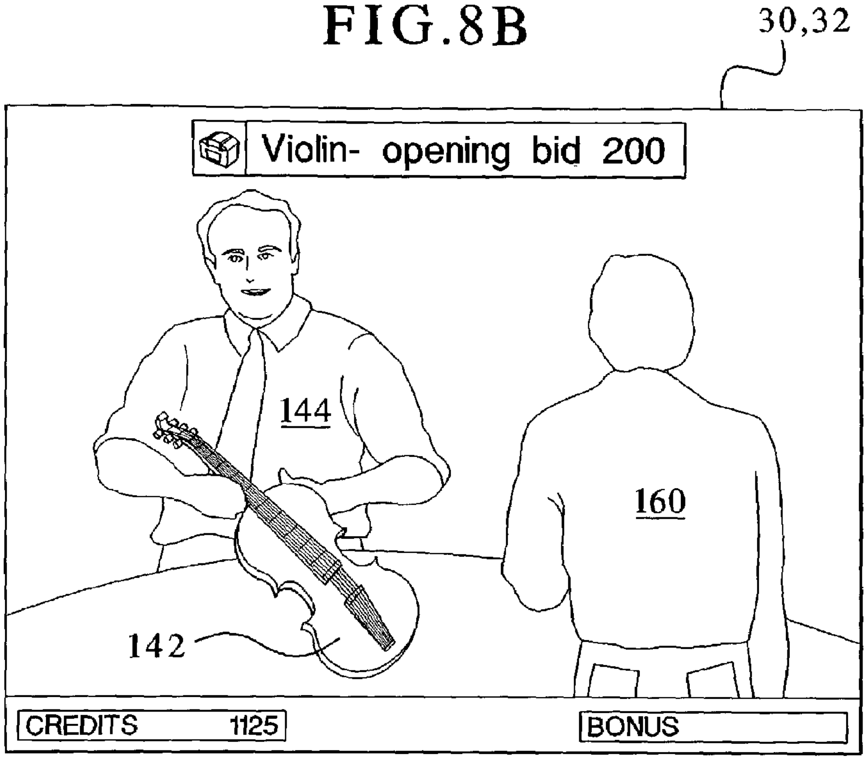
Figure 8C:
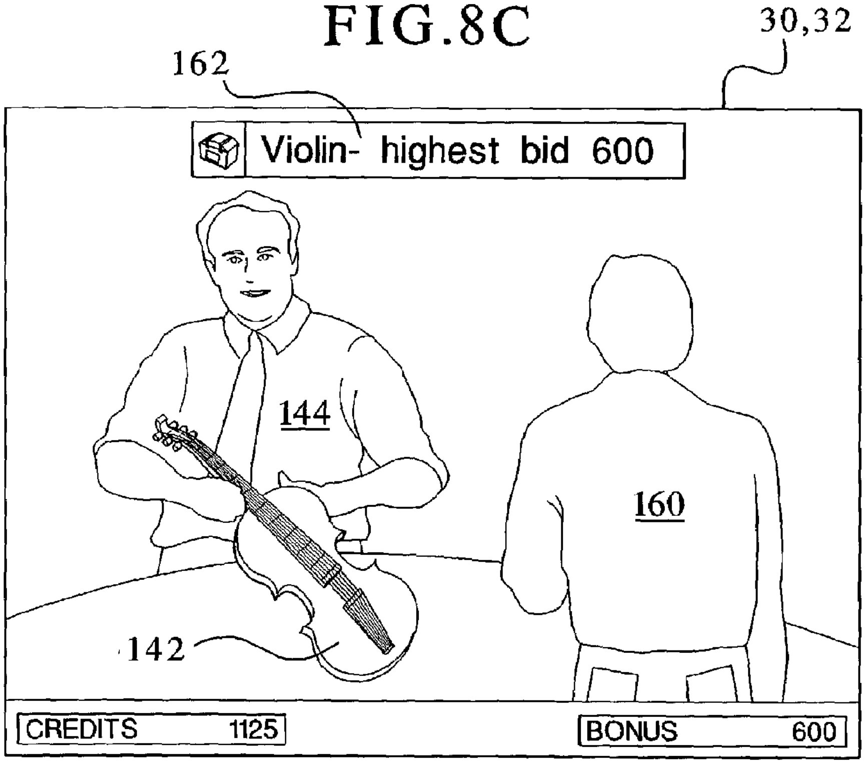

The game displays the same or different game on a display device. The award exchange ending sequence may or may not include player interaction. An example redisplay award exchange alternative ending sequence is illustrated in FIGS. 7A through 7C discussed below. An example different or secondary award exchange sequence is illustrated in FIGS. 8A through 8C discussed below.

Either in the redisplay of the same game or in the display of a new game, the game generates a new award for the player, as indicated by the block 116 and replaces the previously generated award with the newly generated award. The newly generated award is preferably the same type as the previously generated award such as a gaming device credit, however, as mentioned above, the award may be of a different type. Again, the value of the newly generated award includes being less than, equal to or greater than the previously generated award.

The game preferably displays the new award to the player on a display device, as further indicated by the block 116. After generating and displaying the new award, the game updates the player's credit display 16 by the amount of the newly generated award, as indicated by the block 120, and preferably ends the bonus game, as indicated by the oval 122.

A further alternative ending sequence, indicated by the block 108*c*, includes providing the player with an award increase. The award increase ending is preferably not an option for a player since players desire award increases. Executing the award increase alternative ending sequence therefore preferably includes automatically executing the award increase. The award increase ending sequence includes upgrading or replacing the player's generated award with a higher value award.

The game preferably upgrades or replaces the player's generated award by either redisplaying the same game provided in connection with the block 104, as indicated by the block 112, or by displaying a different game than the one provided in connection with the block 104, as indicated by the block 114.

Figure 6A:
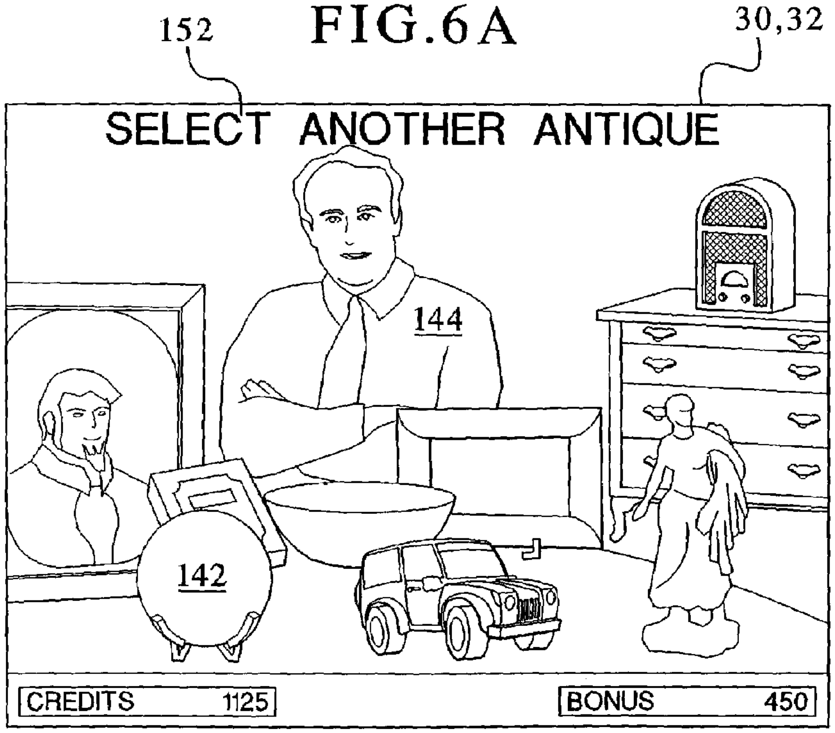
FIGS. 6A, 6B and 6C are front elevational views of one of the display devices of FIGS. 1A and 1B illustrating an award increase ending sequence, wherein the game redisplays the bonus game.
Figure 6B:
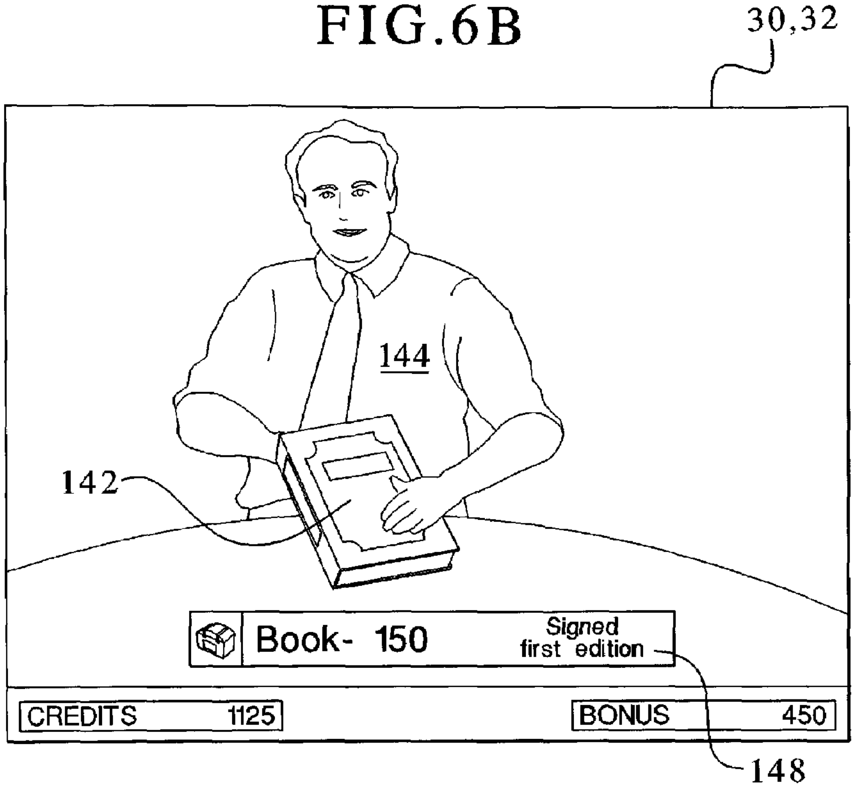
Figure 6C:
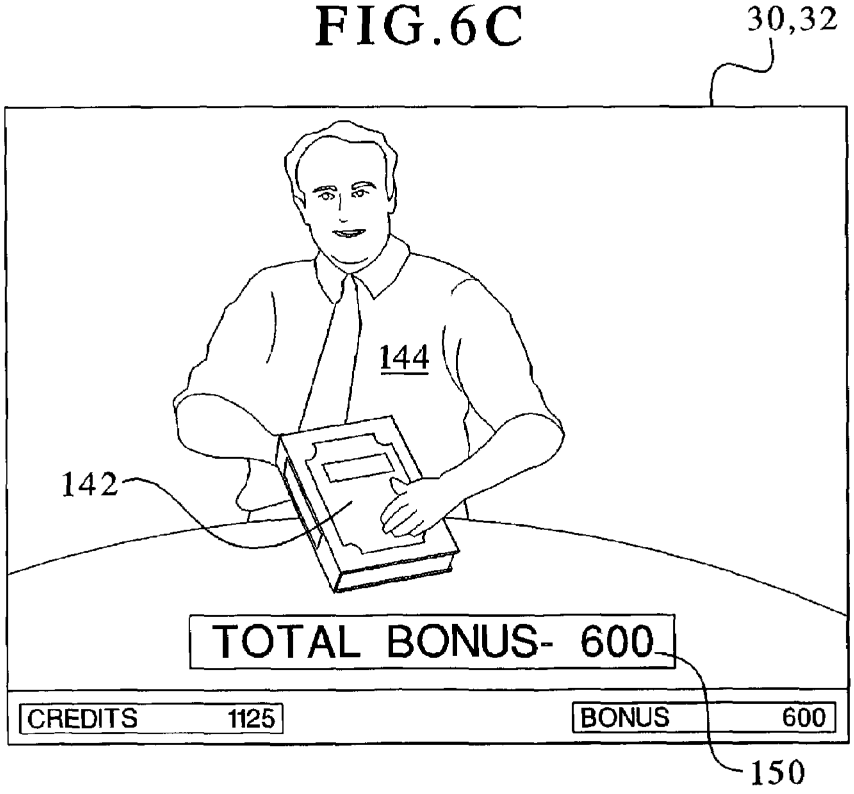

The game preferably displays the same or different game on a display device. The award increase ending sequence may or may not include player interaction. A preferred redisplay award increase alternative ending sequence is illustrated in FIGS. 6A through 6C and discussed below. A preferred different or secondary award increase alternative ending sequence is discussed in connection with the FIGS. 8A through 8C.

Either in the redisplay of the same game or in the display of a new game, the game generates an increased award for the player as indicated by the block 118 and upgrades or replaces the previously generated award with the increased award. The increased award is preferably the same type as the previously generated award.

The game preferably displays the increased award to the player on a display device as further indicated by the block 118. After generating and displaying the increased award, the game updates the player's credit display 16 by the amount of the newly generated award, as indicated by the block 120, and preferably ends the game, as indicated by the oval 122.

The method 100 illustrates one method for operating a gaming device having a bonus scheme with alternative ending sequences. It should be appreciated that from the foregoing description, one skilled in the art can modify the method. One such modification includes generating an alternative ending sequence at anytime after the game triggering event. That is, the present invention includes generating an alternative ending sequence directly after the triggering event, after displaying the game or at anytime during the game sequence. It should also be appreciated that different or further alternative ending sequences may be employed in accordance with the present invention. The ending sequences of the bonus game are preferably randomly selected. Thus the player does not know which ending sequence the player will obtain.

Alternative Ending Sequence Tables

Referring now to FIG. 4A, an ending sequence table 130 includes the alternative ending sequences 132*a* through 132*c* previously discussed in connection with FIG. 3. Specifically, the ending sequence table 130 includes the award credit ending sequence 132*a*, the award increase ending sequence 132*b* and the award exchange ending sequence 132*c*. The present invention contemplates more alternative ending sequences than are illustrated in table 130, as desired by the game implementor and mentioned above. The ending sequence table 130 includes each alternative ending having an equal percentage of being generated by the game.

Referring now to FIG. 4B, an ending sequence table 134 includes the alternative ending sequences 132*a* through 132*c* of table 130, wherein each ending sequence has an associated likelihood of generation percentage 136. The ending sequence table 134 enables the game implementor to weight the ending sequences such that at least one ending sequence is more likely to be generated than at least one other ending sequence. Specifically, the ending sequence table 134 includes the award credit ending sequence 132*a* having a slightly higher chance of generation than either the award increase ending sequence 132*b* or the award exchange ending sequence 132*c*, which are equally weighted. The game implementor sets the likelihood percentages 136 to any desired distribution, wherein the percentages preferably add to one hundred percent.

Example Game Having Award Crediting Ending Sequence

Figure 5A:
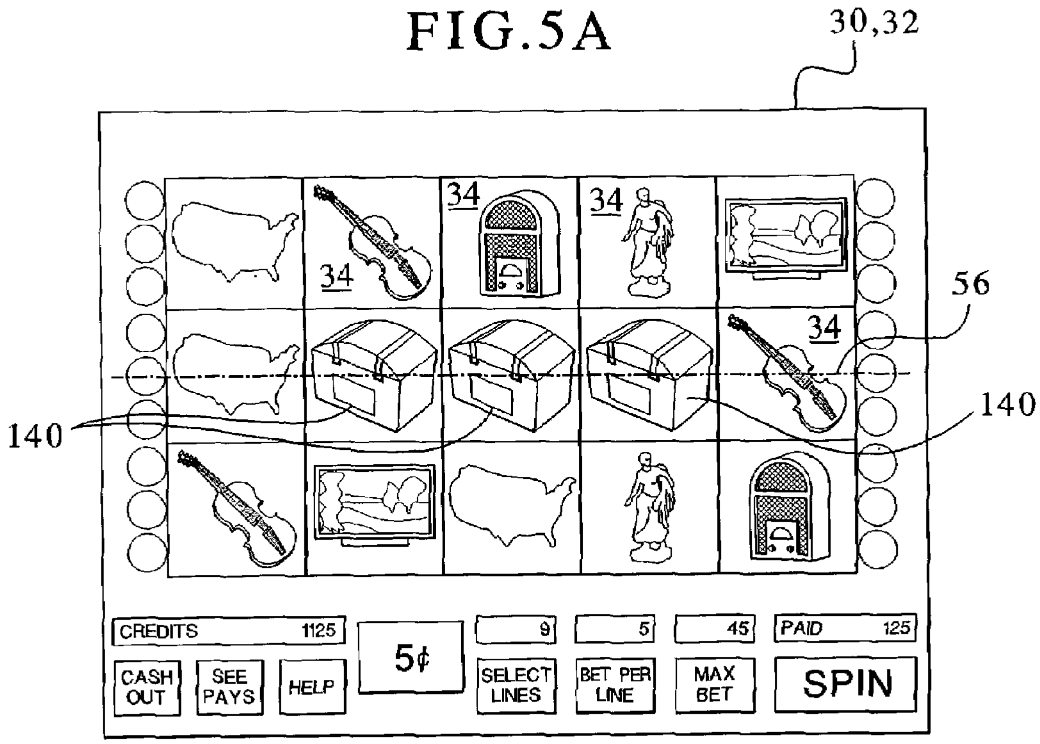
FIGS. 5A, 5B, 5C, 5D, 5E, 5F, 5G, 5H and 5I are front elevational views of one of the display devices of FIGS. 1A and 1B illustrating a bonus game.

Referring now to FIGS. 5A through 5I, one of the display devices 30 or 32 includes one example bonus game which is a property, item or product valuation game such as an antique evaluation game. The illustrated antique evaluation bonus game is a bonus round of a slot machine. FIG. 5A illustrates that the simulated slot machine reels 34 (FIGS. 1A and 1B) display three bonus symbols 140 along a single payline 56. The three bonus symbols 140 trigger the bonus round.

Figure 5B:
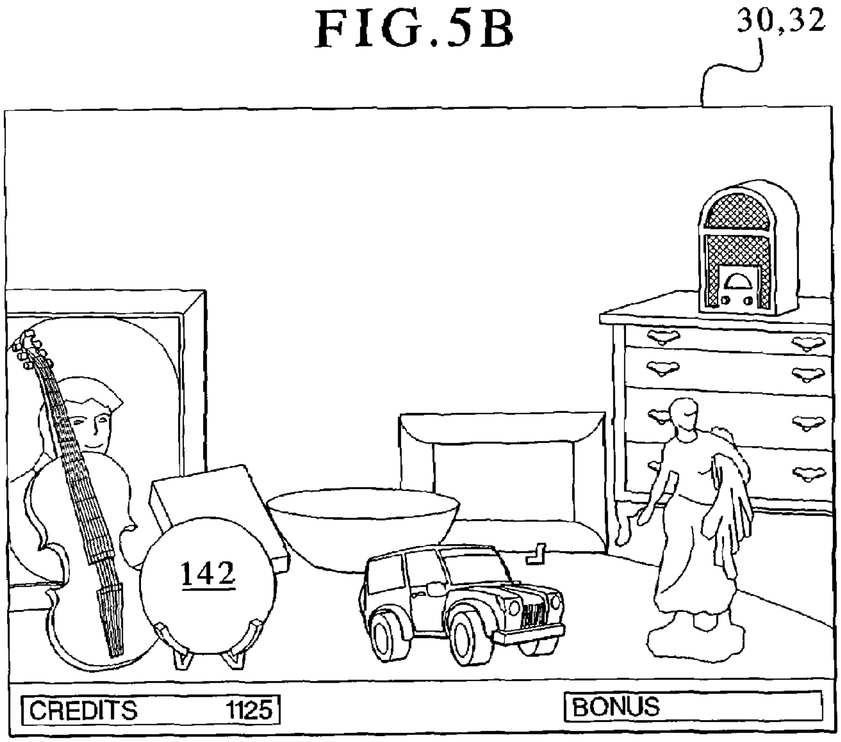

Referring to FIG. 5B, the game generates a plurality of antique items 142 from a table (not illustrated) and displays the antique items or selections 142 to the player preferably as selectable areas of a touch screen 50 having an associated touch screen controller 52 (FIGS. 1A and 1B). Each antique item 142 is thus a separate area of the touch screen 50 adapted to send a discrete input to the controller upon the player's touching or pressing of the area. Alternatively, the bonus game includes displaying the antiques on a video monitor display device 30 or 32 and providing separate electromechanical input devices 44 (FIG. 2).

Figure 5C:
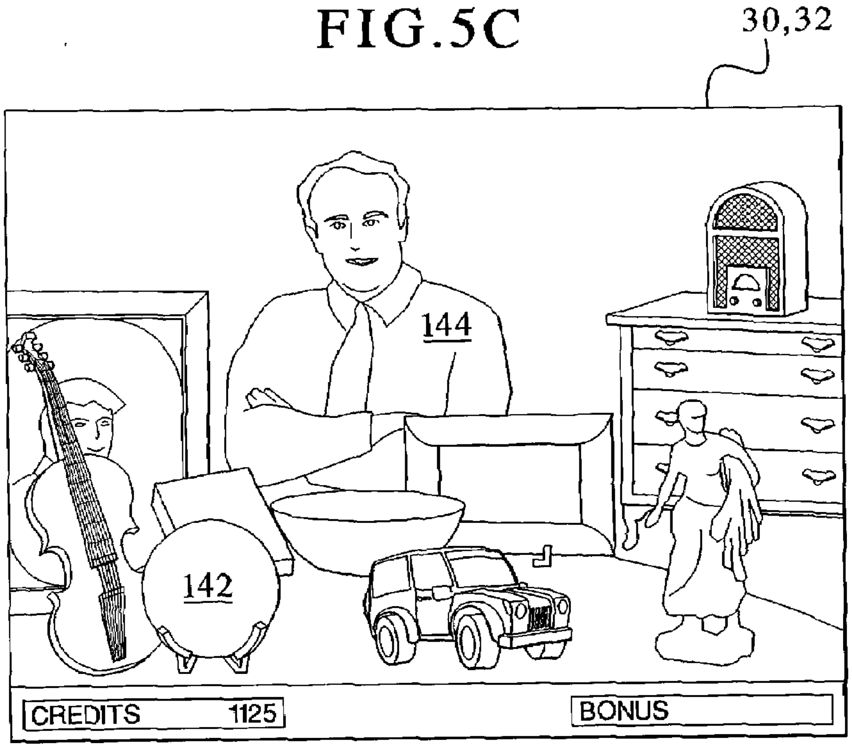
Figure 5D:
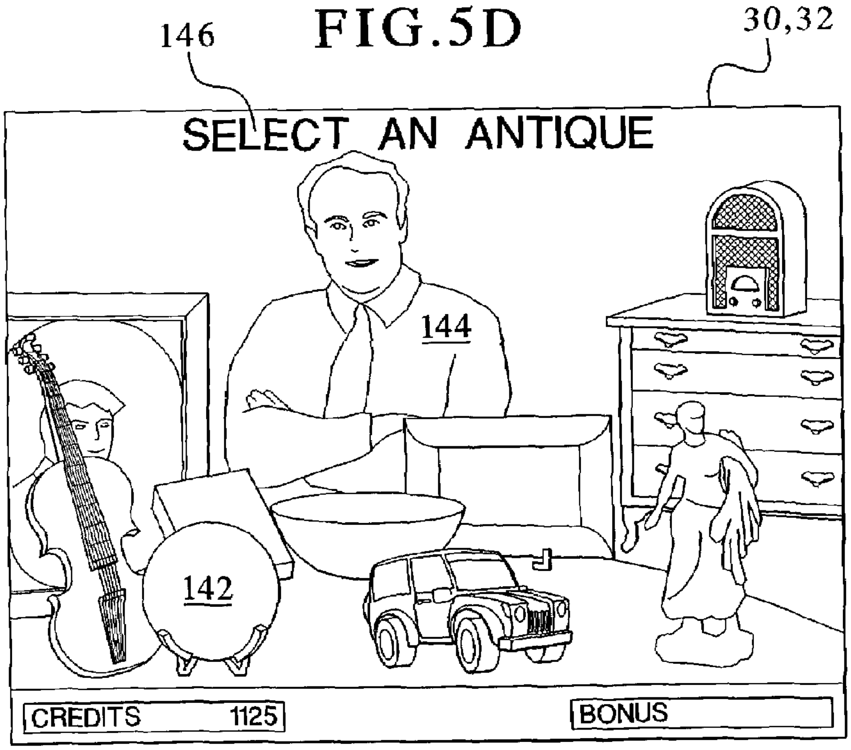
Figure 5E:
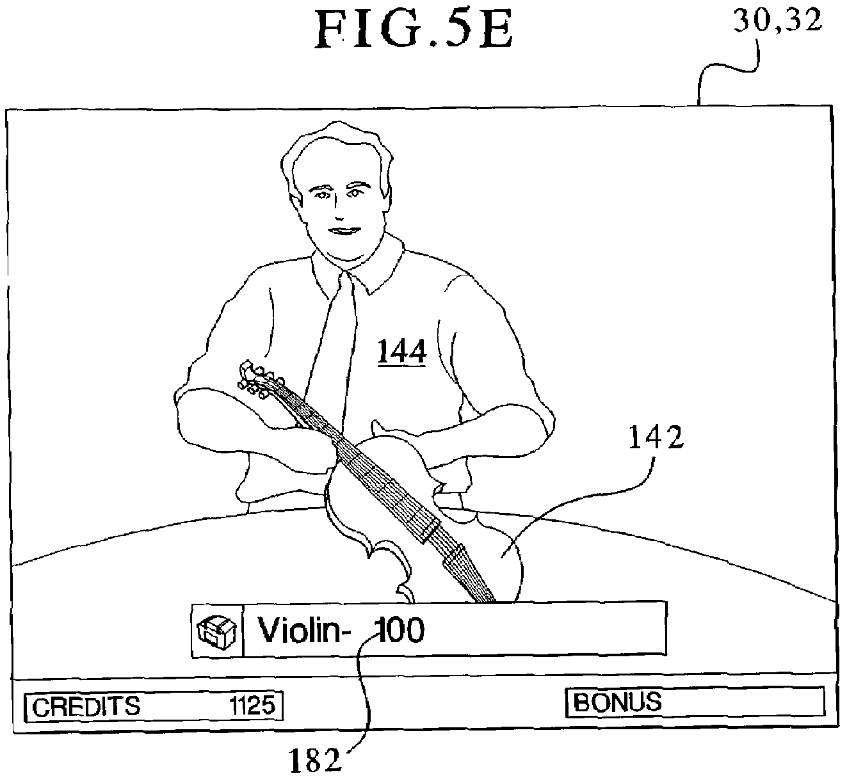

Referring to FIG. 5C, the game randomly displays an actor 144. The bonus game includes providing an introductory audio, visual or audiovisual message by the actor 144, whereby the actor introduces himself or herself and the antique evaluation. The game prompts the player through a suitable audio and/or visual message 146 to pick an antique item 142 as illustrated in FIG. 5D. The player chooses an item such as the violin item 142 as illustrated in FIG. 5E. The game displays an initial award of one hundred to the player.

Figure 5F:
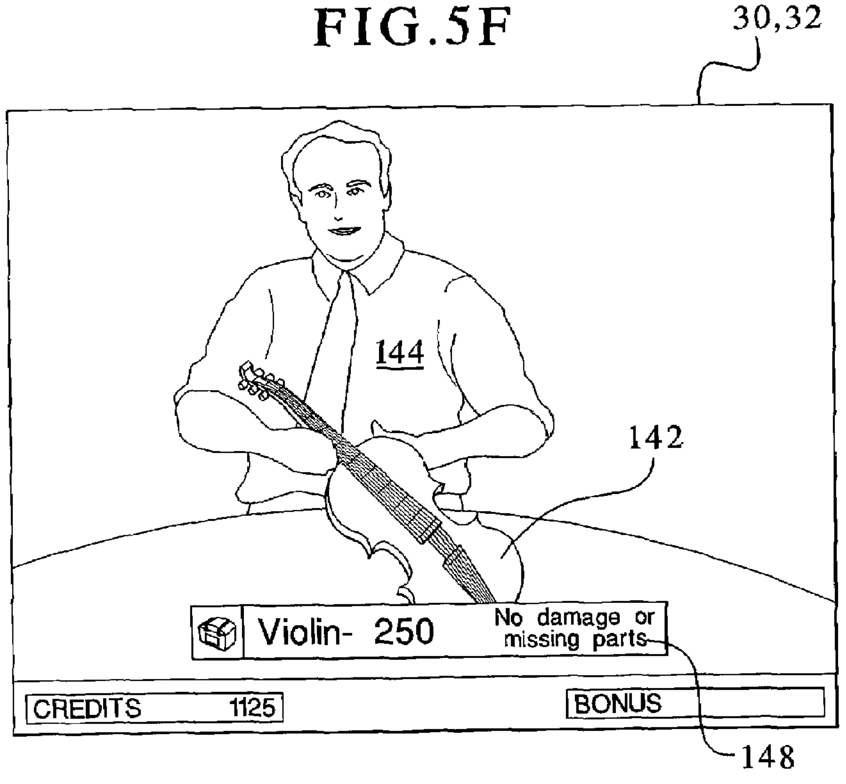

Referring to FIG. 5F, the display device 30 or 32 illustrates a first or review of the violin item 142, which includes increasing the initial award to two hundred fifty. The examination review includes providing an audio, visual or audiovisual evaluation 148, which explains that the award increase is due to no damage or missing parts.

Figure 5G:
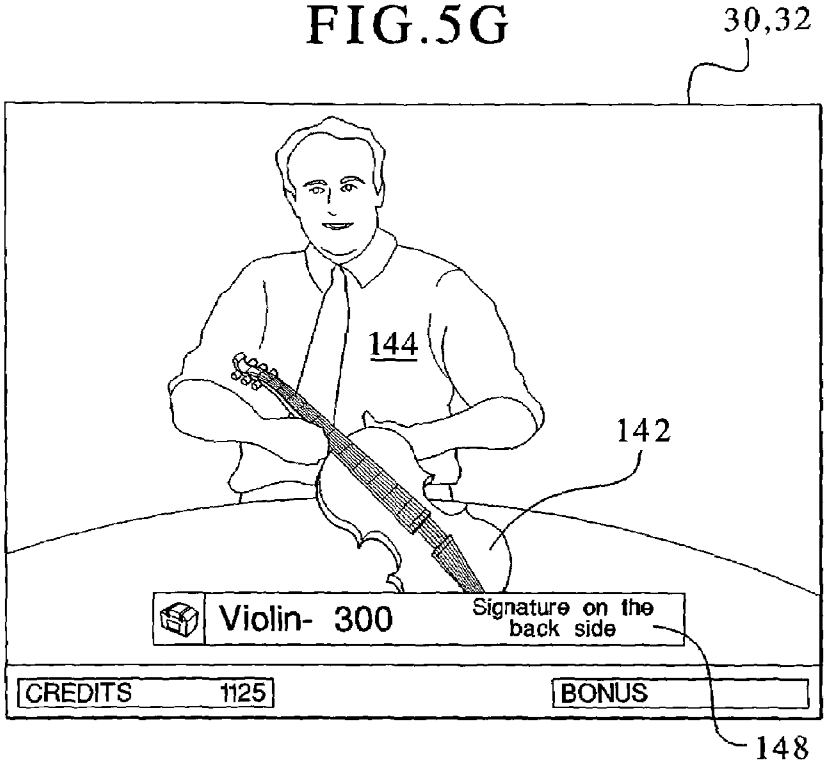

Referring to FIG. 5G, the display device 30 or 32 illustrates a second or review of the violin item 142, which includes increasing the current award to three hundred. The review includes providing an audio, visual or audiovisual evaluation 148, which explains that the award increase is due to a signature on back of the violin.

Figure 5H:
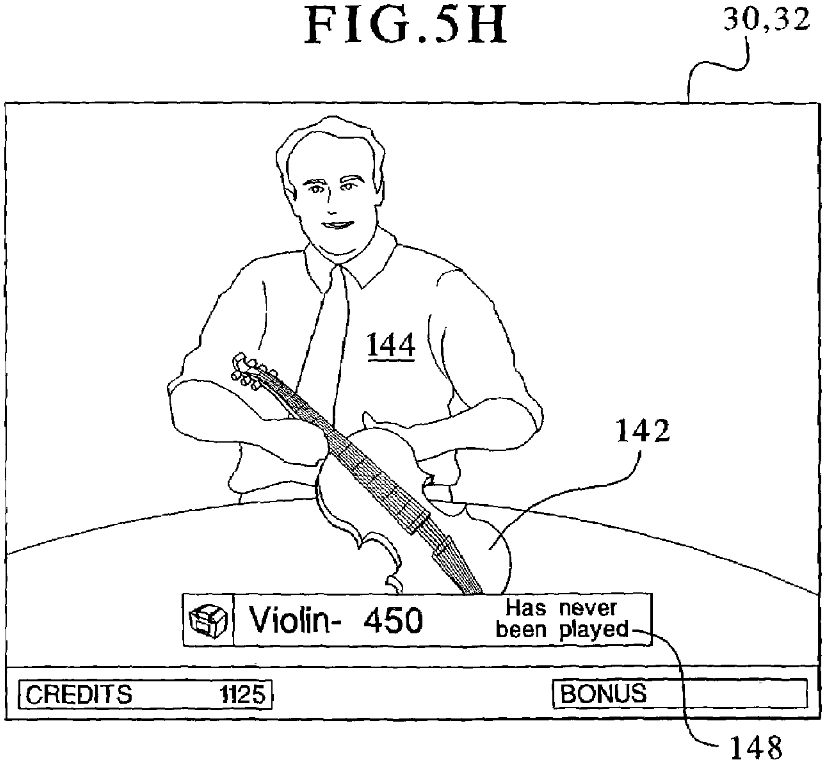

Referring to FIG. 5H, the display device 30 or 32 illustrates a third or review of the violin item 142, which includes increasing the current award to four hundred fifty. The review includes providing an audio, visual or audiovisual evaluation 148, which explains that the award increase is due to the violin item having never been played.

Figure 5I:
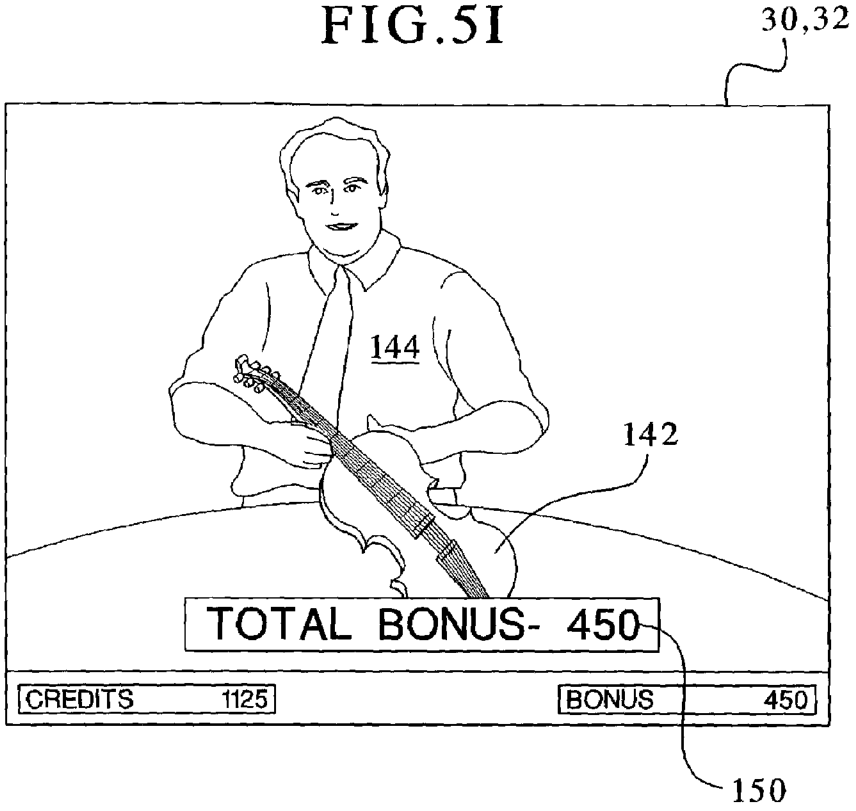

Referring to FIG. 5I, the display device 30 or 32 illustrates that the game provides a suitable audio, visual or audiovisual total bonus message 150 indicating that the bonus game provides an ultimate award of four hundred fifty credits to the player. It should be appreciated that this game merely illustrates one of an infinite number of scenarios by which a gaming device generates a bonus award for the player.

If the game generates an award credit ending (e.g., from a table such as table 130 or 134 of FIGS. 4A and 4B, respectively), the game updates the credit display with the generated award of four hundred fifty. As stated above, in most instances, after crediting the player with an award, the bonus game ends. After ending a bonus round, the game returns to the base game or continues with a different part of the bonus round. After ending in a primary game or stand alone embodiment, the game enables the player to place another wager.

Redisplay Example of Award Increase Ending Sequence

If the game generates an award increase ending sequence (e.g., from a table such as table 130 or 134 of FIGS. 4A and 4B, respectively) the game redisplays the same game or a different game. Referring now to FIGS. 6A through 6C, one of the display devices 30 or 32 displays an example award increase redisplay ending sequence. The redisplay includes another antique evaluation having of a plurality of items 142 and an actor 144. In FIG. 6A, the game provides a message 152 informing the player to pick another item or antique 142. This redisplay ending sequence includes the player picking the item 142, however, the ending sequence is not required to include a player input. Since the alternative ending sequence is an award increase, the message 152 does not present a question or option for the player; rather, the ending sequence begins by prompting the player and does not proceed further until the player picks an item.

Referring to FIG. 6B, the display device 30 or 32 illustrates the player's choice of a book item 142. The actor performs a plurality of examinations reviews on the item 142, as illustrated in FIGS. 5A through 5I. The redisplay includes providing more or less reviews than in the original bonus game, however, the manner in which the bonus game increases and ultimately generates an award remains the same. In FIG. 6B, the review increases the current award for the book or item 142 to one hundred fifty. The review includes providing an audio, visual or audiovisual evaluation 148, which explains that the award increase is due to the book being a signed first edition.

FIG. 6C illustrates that the ending sequence provides the audio, visual or audiovisual total bonus message 150 indicating that the ending sequence provides an ultimate award of six hundred to the player. The award increase ending sequence therefore increases the previously generated award of one hundred fifty by four hundred fifty. At this point, the game updates the credit display 16 (FIGS. 1A and 1B) with the newly generated award of six hundred.

Redisplay Example of Award Exchange Ending Sequence

If the game generates an award exchange ending sequence (e.g., from a table such as table 130 or 134 of FIGS. 4A and 4B, respectively), the game redisplays the same bonus game or a different bonus game. Referring now to FIGS. 7A through 7C, one of the display devices 30 or 32 displays an award exchange redisplay sequence. The redisplay includes another antique evaluation, wherein the actor 144 asks or provides an option to the player to have the same item 142, i.e., the violin of FIGS. 5A through 5I, reevaluated. In FIG. 7A, the game provides an audio, visual or audiovisual option message 154 asking the player if the player desires a second opinion.

Since the exchange alternative ending is preferably an option, the game enables the player to keep the previously generated four hundred fifty credits by picking the keep selection 156 (preferably an area on a touch screen 50 (FIG. 2) or alternatively an electromechanical input device 44), whereby the game updates the credit display 16 as described above. The game also enables the player to risk the previously generated award and try for an award upgrade by picking the preferably simulated reject selection 158. The game includes informing or not informing the player that the newly generated award is potentially less than the previously generated award.

The redisplay ending sequence of FIGS. 7A through 7C does not include a player input because the ending sequence employs the same item 142, i.e., the violin, as in the original sequence of FIGS. 5A through 5I. This alternative ending sequence is thus based on the player's previous input in the bonus game. The redisplay ending sequence alternatively includes a player input. Referring to FIG. 7B and assuming the player rejects the previously generated award, a different actor 144 performs an analysis on the item, as illustrated in FIGS. 5A through 5I. The redisplay includes providing more or less increases or decreases than in the original analysis; however, the manner in which the game increases or decreases and ultimately generates an award remains the same. In FIG. 7B, the review includes providing an audio, visual or audiovisual evaluation 148, which explains that the award decrease is due to the signature on the back of the violin being fake.

FIG. 7C illustrates that the alternative ending sequence provides an audio, visual or audiovisual total bonus message 150 indicating that the alternative ending sequence provides an ultimate award of three hundred fifty to the player. The award exchange alternative ending sequence therefore decreases the previously generated award of four hundred fifty by one hundred. The award exchange alternative ending sequence also includes increasing or maintaining the previously generated award. At this point, the game updates the credit display 16 (FIGS. 1A and 1B) with the newly generated award of three hundred fifty.

New Sequence Example of Award Exchange Ending Sequence

If the game generates an award exchange ending sequence, the game includes displaying a different game ending sequence. Referring now to FIGS. 8A through 8C, one of the display devices 30 or 32 displays a new or different award exchange ending sequence. The new or different ending sequence does not include an antique evaluation; rather, in this example it includes a bid sequence wherein characters 160 bid on the same item 142, such as the violin of FIGS. 5A through 5I. The game provides the audio, visual or audiovisual option message 154 asking the player if the player would like to try for a bid at the auction as illustrated in FIG. 8A.

Since the exchange alternative ending sequence is preferably an option, the game enables the player to keep the previously generated four hundred fifty credits by picking the keep selection 156, or to risk the previously generated award and try for an award upgrade by picking the reject selection 158. The game includes informing or not informing the player that the newly generated award is potentially less than the previously generated award.

The different or new alternative ending sequence of FIGS. 8A through 8C does not include a player input, i.e., the ending sequence employs the same item 142, the violin, as in the original bonus game of FIGS. 5A through 5I. The new or different alternative ending sequence alternatively includes a player input. Referring to FIG. 8B and assuming the player rejects the previously generated award, a plurality of different characters 160 bid on the item 142, which is a different award increase or decrease mechanism than the appraisals or reviews described in FIGS. 5A through 5I. In FIG. 8B, the bid opens at two hundred, an amount less than the previously generated award amount of four hundred fifty and increases as the characters 160 bid up the price for the violin item 142. The bidding can stop short of the previously generated amount or surpass the previously generated amount according to a random generation.

FIG. 8C illustrates in the video or audio visual message 162 that in the new or different sequence, one character has made a highest bid of six hundred, which is the player's ultimate award. The award exchange ending sequence therefore increases the previously generated award of four hundred fifty by one hundred fifty. The new or different ending sequence also includes maintaining or decreasing the previously generated award. At this point, the game updates the credit display 16 (FIGS. 1A and 1B) with the most recently generated award of six hundred.

If the game generates an award increase alternative ending sequence, the game includes displaying a different ending sequence. It should be appreciated that the new or different ending sequence of FIGS. 8A through 8C is easily adaptable for the award increase ending sequence. That is, in FIG. 8A, the new or different version of the award increase ending sequence does not include the keep selector 156 or the reject selector 158; rather, the game automatically begins the bid sequence, wherein characters 160 bid on the same item 142, i.e., the violin of FIGS. 5A through 5I. In FIG. 8B, the bid opens at the previously generated award of four hundred fifty rather than the lower amount of two hundred, whereby the characters 160 can only increase the award as they bid up the price for the violin item 142. In this award increase ending sequence, the visual or audiovisual message 162 illustrates that the bidding increases the previously generated amount to the highest bid of six hundred provided by one of the characters 160.

As indicated above, it should also be appreciated that the alternative ending sequence could, in accordance with the present invention, include an independent bonus game such as a match game, selection picking game, a selection picking game with a terminator or any other suitable game. This alternative ending sequence may or may not employ the values previously generated in the bonus game such as the preliminary award.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a bonus game;

a display device adapted to display the bonus game to a player; and a processor in communication with the display device, wherein the processor is programmed to operate with the display device to:

(a) initiate a preliminary bonus game sequence, (b) display a preliminary award generated as an outcome of said preliminary bonus game sequence, (c) randomly select independent of player input one of a plurality of different predefined alternative ending sequences for said bonus game, wherein a plurality of the alternate ending sequences each include at least one preliminary award modification step which occurs after the display of the preliminary award, and wherein each of the ending sequences that include at least one preliminary award modification step are configured to modify the preliminary award in one of a plurality of different predetermined manners, and (d) displays said randomly selected alternative ending sequence to modify the preliminary award in the predetermined manner associated with the selected ending sequence to determine a final award to provide to the player, wherein the final award is based on the preliminary award and any modifications to the preliminary award generated by the selected alternative ending sequence.

2. A gaming device comprising:

a bonus game;

a display device adapted to display the bonus game to a player; and a processor in communication with the display device, wherein the processor is programmed to operate with the display device to:

(a) initiate a preliminary bonus game sequence, (b) display a preliminary award generated as an outcome of said preliminary bonus game sequence, (c) randomly select independent of player input one of a plurality of different alternative ending sequences for said bonus game, wherein a plurality of the alternate ending sequences each include at least one preliminary award modification step which occurs after the display of the preliminary award, and wherein each of the ending sequences that include at least one preliminary award modification step being configured to modify the preliminary award in one of a plurality of predetermined manners, and one of said alternative ending sequences including a redisplay of the same preliminary game sequence, and (d) display said randomly selected alternative ending sequence to modify the preliminary award in the predetermined manner associated with the selected ending sequence to determine a final award to provide to the player based on the preliminary award and any modifications to the preliminary award generated by the selected alternative ending sequence.

3. A gaming device comprising:

a bonus game;

a display device adapted to display the bonus game to a player; and a processor in communication with the display device, wherein the processor is programmed to operate with the display device to:

(a) initiate a preliminary bonus game sequence, (b) display a preliminary award generated as an outcome of said preliminary bonus game sequence, and (c) randomly select independent of player input one of a plurality of different alternative ending sequences for said bonus game, wherein a plurality of the alternate ending sequences include at least one preliminary award modification step which occurs after the display of the preliminary award, and wherein each of the ending sequences that include at least one preliminary award modification step being configured to modify the preliminary award in one of a plurality of predetermined manners, and one of said alternative ending sequences including a display of a different bonus game sequence, and one of said alternative ending sequences including a display of a different bonus game, and (d) display said selected alternative ending sequence to change the preliminary award in the predetermined manner associated with the selected ending sequence to determine a final award to provide to the player based on the preliminary award and any changes generated by the selected alternative ending sequence.

4. A gaming device comprising:

a bonus game;

a display device adapted to display the bonus game to a player; and a processor in communication with the display device, wherein the processor is programmed to operate with the display device to:

(a) initiate a preliminary bonus game sequence, (b) provide a preliminary award generated as an outcome of said preliminary bonus game sequence, (c) randomly select independent of player input one of a plurality of different alternative ending sequences for said bonus game, wherein a plurality of the alternate ending sequences include at least one preliminary award modification step which occurs after the display of the preliminary award, and wherein each of the ending sequences that include at least one preliminary award modification step being configured to modify the preliminary award in one of a plurality of predetermined manners, one of said alternative ending sequences including an option to exchange said preliminary award for a final award where the final award may be less than the preliminary award, and (d) display said randomly selected alternative ending sequence to modify the preliminary award in the predetermined manner associated with the selected ending sequence to determine a final award to provide to the player based on the preliminary award and any modifications to the preliminary award generated by the selected alternative ending sequence.

5. A gaming device comprising:

a bonus game;

a display device adapted to display the bonus game to a player; and a processor in communication with the display device, wherein the processor is programmed to operate with the display device to:

(a) initiate a preliminary bonus game sequence, (b) display a preliminary award generated as an outcome of said preliminary bonus game sequence, (c) randomly select independent of player input one of a plurality of different alternative ending sequences for said bonus game including an award ending sequence, an award increase sequences, and an award exchange sequence that includes an option to exchange the preliminary award for a final award where the final award may be less than the preliminary award, wherein at least one of the alternate ending sequences include at least one preliminary award modification step which occurs after the display of the preliminary award, and wherein each of the ending sequences that include at least one preliminary award modification step being configured to modify the preliminary award in one of a plurality of predetermined manners, and (d) display said randomly selected alternative ending sequence to modify the preliminary award in the predetermined manner associated with the selected ending sequence to determine the final award to provide to the player based on the preliminary award and any modifications to the preliminary award generated by the selected alternative ending sequence.

6. A method for operating a gaming device, said method comprising the steps of:

(a) displaying a bonus game;

(b) initiating a preliminary bonus game sequence;

(c) generating a preliminary award as an outcome of said preliminary bonus game sequence and displaying said preliminary award;

(d) randomly generating one of a plurality of different alternative ending sequences for said bonus game independent of player input, said alternative ending sequences including an award crediting sequence, an award increase sequence, and an award exchange option sequence that includes an option to exchange the preliminary award for a final award and where the final award may be less than the preliminary award, wherein a plurality of the alternate ending sequences each include at least one preliminary award modification step which occurs after the display of the preliminary award, and wherein each of the ending sequences that include at least one preliminary award modification step being configured to modify the preliminary award in one of a plurality of predetermined manners;

(e) executing said randomly generated alternative ending sequence to modify the preliminary award in the predetermined manner associated with the selected ending sequence to determine a final award to provide the player based on the preliminary award and any modifications generated by the alternative ending sequence;

(f) providing the final award to the player; and (g) ending the bonus game.

7. The method of claim 6, wherein executing said award increase sequence includes redisplaying the preliminary award generating sequence of said bonus game.

8. The method of claim 6, wherein executing said award increase sequence includes displaying a different bonus game.

9. The method of claim 6, wherein executing said award increase sequence includes increasing said generated preliminary award.

10. The method of claim 6, wherein executing said award exchange option sequence includes enabling a player to accept said generated preliminary award or exchange the preliminary award for another award.

11. The method of claim 6, wherein executing said award exchange option sequence includes replacing said generated preliminary award with another award.

12. The method of claim 6, wherein the method is provided to a player through a data network.

13. The method of claim 12, wherein the data network is an internet.

14. A method for operating a gaming device, said method comprising the steps of:

(a) displaying a bonus game;

(b) initiating a preliminary bonus game sequence;

(c) generating a preliminary award as an outcome of said preliminary bonus game sequence and displaying said preliminary award;

(d) randomly generating one of a plurality of different alternative ending sequences independent of player input, said alternative ending sequences including an award crediting sequence and an award increase sequence, wherein a plurality of the alternate ending sequences each include at least one preliminary award modification step which occurs after the display of the preliminary award, and wherein each of the ending sequences that include at least one preliminary award modification step being configured to modify the preliminary award in one of a plurality of predetermined manners;

(e) executing and displaying said randomly generated alternative ending sequence to modify the preliminary award in the predetermined manner associated with the selected ending sequence to determine a final award to provide to the player based on the preliminary award and any modifications generated by the alternative ending sequence;

(f) providing the final award to the player; and (g) ending the bonus game.

15. The method of claim 14, wherein the method is provided to a player through a data network.

16. The method of claim 15, wherein the data network is an internet.

17. A gaming device comprising:

a display device; and a processor operable with a bonus game to:

(a) initiate a display of a preliminary bonus game sequence having a preliminary award outcome on the display device;

(b) randomly generate an alternative ending for said bonus game independent of player input, said ending randomly selected from a plurality of different alternative endings including an award crediting ending, an award increase ending and an award exchange ending, wherein a plurality of the alternate ending sequences each include at least one preliminary award modification step which occurs after the display of the preliminary award, and wherein each of the ending sequences that include at least one preliminary award modification step being configured to modify the preliminary award in one of a plurality of predetermined manners;

(c) direct a credit indicator update if said randomly generated alternative ending is said award crediting ending;

(d) direct a display of an increase to the preliminary award outcome if said randomly generated alternative ending is said award increase ending; and (e) direct a display of an award exchange of said preliminary award outcome if said randomly generated alternative ending is said award exchange ending, wherein a final award may be less than the preliminary award.

18. A gaming device comprising:

a bonus game;

a display device adapted to display the bonus game to a player; and a processor in communication with the display device, wherein the processor is programmed to operate with the display device to provide (a) a preliminary bonus game sequence, (b) a preliminary award generated as an outcome of said preliminary bonus game sequence, and (c) a plurality of different predefined alternative ending sequences for said bonus game, said ending sequences including at least one sequence that includes a number of award modification steps and changes the preliminary award, wherein each of said ending sequences affects the preliminary award in one of a plurality of different predetermined manners, and wherein after the preliminary award has been generated and displayed to the player one of said alternative ending sequences is randomly selected by the processor independent of player input, and the processor employs said randomly selected alternative ending sequence to affect the preliminary award in the predetermined manner associated with the selected ending sequence to determine a final award to provide to the player, wherein the final award is based on the preliminary award and any changes to the preliminary award generated by the selected alternative ending sequence.

19. A method for operating a gaming device, said method comprising the steps of:

(a) displaying a bonus game;

(b) initiating a preliminary bonus game sequence;

(c) generating a preliminary award as an outcome of said preliminary bonus game sequence and displaying said preliminary award;

(c) randomly generating independent of player input one of a plurality of different alternative ending sequences for said bonus game, said alternate ending sequences including at least one ending sequence that includes a number of preliminary award modification steps that changes the preliminary award, wherein each of said ending sequences affects the preliminary award in one of a plurality of different predetermined manners;

(e) executing said randomly generated alternative ending sequence to affect the preliminary award in the predetermined manner associated with the selected ending sequence to determine a final award to provide the player based on the preliminary award and any changes generated by the executed alternative ending sequence;

(f) providing the final award to the player; and (g) ending the bonus game.

* * * * *

UNITED STATES PATENT AND TRADEMARK OFFICE

CERTIFICATE OF CORRECTION

PATENT NO. : 7,371,174 B2
APPLICATION NO. : 10/160687
DATED : May 13, 2008
INVENTOR(S) : Anthony J. Baerlocher It is certified that error appears in the above-identified patent and that said Letters Patent is hereby corrected as shown below:

In Claim 19, Column 18, Line 4 change “(c)” to --(d)--.

Signed and Sealed this

Twenty-first Day of October, 2008

JON W. DUDAS
*Director of the United States Patent and Trademark Office*